US011387873B2

(12) United States Patent
Hao et al.

(10) Patent No.: US 11,387,873 B2
(45) Date of Patent: Jul. 12, 2022

(54) REFERENCE RESOURCE INDICATION TECHNIQUES IN WIRELESS COMMUNICATIONS

(71) Applicant: Qualcomm Incorporated, San Diego, CA (US)

(72) Inventors: Chenxi Hao, Beijing (CN); Yu Zhang, Beijing (CN); Wanshi Chen, San Diego, CA (US); Peter Gaal, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/963,495

(22) PCT Filed: Jan. 14, 2019

(86) PCT No.: PCT/CN2019/071596
§ 371 (c)(1),
(2) Date: Jul. 20, 2020

(87) PCT Pub. No.: WO2019/141147
PCT Pub. Date: Jul. 25, 2019

(65) Prior Publication Data
US 2020/0358493 A1 Nov. 12, 2020

(30) Foreign Application Priority Data

Jan. 20, 2018 (WO) ................ PCT/CN2018/073542

(51) Int. Cl.
*H04W 72/14* (2009.01)
*H04B 7/0456* (2017.01)
(Continued)

(52) U.S. Cl.
CPC ......... *H04B 7/0456* (2013.01); *H04B 7/0617* (2013.01); *H04L 5/0051* (2013.01);
(Continued)

(58) Field of Classification Search
CPC . H04B 7/0456; H04L 25/0226; H04L 5/0048; H04W 72/14; H04W 76/27; H04W 72/042
See application file for complete search history.

(56) References Cited

U.S. PATENT DOCUMENTS

2009/0109908 A1   4/2009  Bertrand et al.
2011/0158191 A1   6/2011  Zhang et al.
(Continued)

FOREIGN PATENT DOCUMENTS

WO   WO-2016191135 A1   12/2016

OTHER PUBLICATIONS

International Search Report and Written Opinion—PCT/CN2018/073542—ISA/EPO—dated Aug. 30, 2018.
(Continued)

*Primary Examiner* — Fahmida S Chowdhury
(74) *Attorney, Agent, or Firm* — Holland & Hart LLP

(57) ABSTRACT

Methods, systems, and devices for wireless communications are described. One or more reference signals may be transmitted by a user equipment (UE) that may be used by a base station for channel estimation and determination of one or more parameters to be used for subsequent uplink transmission of the UE. The base station may transmit an indication of uplink transmission parameters in an uplink grant that is transmitted to the UE. The UE may modify one or more subsequent reference signal transmissions based on the uplink grant received from the base station and a timing of the uplink grant relative to the one or more subsequent reference signal transmissions. The base station may deter-
(Continued)

mine a timing for the uplink grant based on a timing associated with the reference signal transmissions from the UE.

26 Claims, 22 Drawing Sheets

(51) Int. Cl.
  *H04W 76/27* (2018.01)
  *H04B 7/06* (2006.01)
  *H04L 5/00* (2006.01)
  *H04L 25/02* (2006.01)
  *H04W 80/02* (2009.01)

(52) U.S. Cl.
  CPC ......... *H04L 25/0226* (2013.01); *H04W 72/14* (2013.01); *H04W 76/27* (2018.02); *H04W 80/02* (2013.01)

(56) References Cited

U.S. PATENT DOCUMENTS

| | | | |
|---|---|---|---|
| 2013/0012252 A1 | 1/2013 | Suzuki et al. | |
| 2013/0100833 A1* | 4/2013 | Xu | H04W 52/42 370/252 |
| 2015/0351092 A1* | 12/2015 | Seo | H04L 5/0046 370/329 |
| 2016/0057743 A1* | 2/2016 | Aiba | H04W 72/0406 370/329 |
| 2016/0344526 A1 | 11/2016 | Fan et al. | |
| 2017/0265212 A1 | 9/2017 | Zhang et al. | |
| 2017/0302419 A1 | 10/2017 | Liu et al. | |
| 2019/0074882 A1* | 3/2019 | Zhou | H04L 5/0053 |
| 2019/0379501 A1* | 12/2019 | Park | H04B 7/0617 |
| 2020/0083998 A1* | 3/2020 | Chen | H04W 72/12 |
| 2020/0275416 A1* | 8/2020 | Haghighat | H04B 7/0456 |
| 2020/0336264 A1* | 10/2020 | Faxér et al. | H04L 5/0048 |
| 2020/0366355 A1* | 11/2020 | Liu | H04B 7/0617 |

OTHER PUBLICATIONS

International Search Report and Written Opinion—PCT/CN2019/071596—ISA/EPO—dated Apr. 17, 2019.

Qualcomm Incorporated: "Remaining Details on Codebook Based UL Transmission", 3GPP TSG RAN WG1 Meeting AH 1801, R1-1800854, Jan. 13, 2018, 2 pages.

Qualcomm Incorporated: "Remaining Details on Non-Codebook Based UL Transmission", 3GPP TSG RAN WG1 Meeting AH 1801, R1-1800855, Jan. 13, 2018, 3 pages, Section 2.

Supplementary European Search Report—EP19741896—Search Authority—Munich—dated Sep. 10, 2021.

* cited by examiner

REFERENCE RESOURCE INDICATION TECHNIQUES IN WIRELESS COMMUNICATIONS

CROSS REFERENCES

The present Application is a 371 national phase of International Patent Application No. PCT/CN2019/071596 by Hao et al., entitled "REFERENCE RESOURCE INDICATION TECHNIQUES IN WIRELESS COMMUNICATIONS," filed Jan. 14, 2019; and PCT Patent Application No. PCT/CN2018/073542 by Hao et al., entitled "REFERENCE RESOURCE INDICATION TECHNIQUES IN WIRELESS COMMUNICATIONS," filed Jan. 20, 2018, each of which is assigned to the assignee hereof which is hereby incorporated by reference in their entirety.

BACKGROUND

The following relates generally to wireless communication, and more specifically to reference resource indication techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, base stations and UEs may transmit one or more signals that may be used for channel estimation and for deriving various transmission parameters. For example, a base station or UE may transmit one or more reference signal that may be used for estimation of an amount of interference and noise that is present in a channel. Such channel estimations may be used to set one or more transmission parameters for subsequent transmissions between a base station and a UE, and may be used to set one or more parameters for use in receiving and decoding such subsequent transmissions. Efficient channel estimation and determination of transmit and receive parameters may help to enhance the overall efficiency of a wireless communications system.

SUMMARY

The described techniques relate to improved methods, systems, devices, or apparatuses that support reference resource indication techniques in wireless communications. Generally, the described techniques provide for transmission of one or more reference signals by a user equipment (UE) that may be used by a base station for channel estimation and determination of one or more parameters to be used for subsequent uplink transmission of the UE. In some cases, a UE may transmit a first reference signal using a first set of reference signal resources (e.g., using a first precoding configuration and a first set of reference signal ports), that the base station may receive and process to determine that the UE should use certain transmission parameters for an uplink transmission. In some cases, the base station may transmit an indication of the uplink transmission parameters (e.g., an indication of the precoding configuration and reference signal ports for the uplink transmission) in an uplink grant that is transmitted to the UE. In some cases, the UE may modify one or more subsequent reference signal transmissions based on the uplink grant received from the base station and a timing of the uplink grant relative to the one or more subsequent reference signal transmissions. In some cases, the base station may determine a timing for the uplink grant based on a timing associated with the reference signal transmissions from the UE.

A method of wireless communication is described. The method may include transmitting a first reference signal using a first set of reference signal resources, the first set of reference signal resources associated with a first set of reference signal ports having a first precoding configuration applied to a set of antenna ports, receiving an uplink grant and a sounding reference signal (SRS) resource indicator (SRI) that indicates at least one reference signal port from the first set of reference signal ports is to be used for an uplink transmission, identifying that a second reference signal is to be transmitted after receiving the uplink grant and before the uplink transmission, the second reference signal associated with a second set of reference signal resources, and modifying the second reference signal based at least in part on the receiving the uplink grant.

An apparatus for wireless communication is described. The apparatus may include means for transmitting a first reference signal using a first set of reference signal resources, the first set of reference signal resources associated with a first set of reference signal ports having a first precoding configuration applied to a set of antenna ports, means for receiving an uplink grant and a SRI that indicates at least one reference signal port from the first set of reference signal ports is to be used for an uplink transmission, means for identifying that a second reference signal is to be transmitted after receiving the uplink grant and before the uplink transmission, the second reference signal associated with a second set of reference signal resources, and means for modifying the second reference signal based at least in part on the receiving the uplink grant.

Another apparatus for wireless communication is described. The apparatus may include a processor, memory in electronic communication with the processor, and instructions stored in the memory. The instructions may be operable to cause the processor to transmit a first reference signal using a first set of reference signal resources, the first set of reference signal resources associated with a first set of reference signal ports having a first precoding configuration applied to a set of antenna ports, receive an uplink grant and a SRI that indicates at least one reference signal port from the first set of reference signal ports is to be used for an uplink transmission, identify that a second reference signal is to be transmitted after receiving the uplink grant and before the uplink transmission, the second reference signal associated with a second set of reference signal resources, and modify the second reference signal based at least in part on the receiving the uplink grant.

A non-transitory computer-readable medium for wireless communication is described. The non-transitory computer-readable medium may include instructions operable to cause a processor to transmit a first reference signal using a first set of reference signal resources, the first set of reference signal resources associated with a first set of reference signal ports having a first precoding configuration applied to a set of antenna ports, receive an uplink grant and a SRI that indicates at least one reference signal port from the first set of reference signal ports is to be used for an uplink transmission, identify that a second reference signal is to be transmitted after receiving the uplink grant and before the uplink transmission, the second reference signal associated with a second set of reference signal resources, and modify the second reference signal based at least in part on the receiving the uplink grant.

In some examples of the method, apparatus, and non-transitory computer-readable medium described above, the modifying the second reference signal may include using the precoding configuration associated with the first set of reference signal resources for the second set of reference signal resources. In some examples of the method, apparatus, and non-transitory computer-readable medium described above, the modifying the second reference signal may include dropping transmission of the second reference signal.

Some examples of the method, apparatus, and non-transitory computer-readable medium described above may further include processes, features, means, or instructions for identifying a timing threshold associated with the uplink transmission. Some examples of the method, apparatus, and non-transitory computer-readable medium described above may further include processes, features, means, or instructions for determining that a time difference between an end of a transmission period of the second reference signal and a start of a transmission period of the first uplink transmission exceeds the timing threshold. Some examples of the method, apparatus, and non-transitory computer-readable medium described above may further include processes, features, means, or instructions for transmitting the second reference signal using a second precoding configuration for the second set of reference signal resources.

Some examples of the method, apparatus, and non-transitory computer-readable medium described above may further include processes, features, means, or instructions for identifying a timing threshold associated with the uplink transmission, determining that a time difference between an end of a transmission period of the second reference signal and a start of a transmission period of the uplink transmission is less than or equal to the timing threshold, and transmitting the second reference signal using the first precoding configuration associated with the first set of reference signal resources.

Some examples of the method, apparatus, and non-transitory computer-readable medium described above may further include processes, features, means, or instructions for identifying a timing threshold associated with the uplink transmission, and determining that a time difference between an end of a transmission period of the second reference signal and a start of a transmission period of the uplink transmission is less than or equal to the timing threshold, wherein the modifying the second reference signal comprises dropping transmission of the second reference signal.

Some examples of the method, apparatus, and non-transitory computer-readable medium described above may further include processes, features, means, or instructions for receiving, from a base station, an indication of a timing threshold, wherein the modifying the second reference signal is based at least in part on the timing threshold In some examples of the method, apparatus, and non-transitory computer-readable medium described above, when the time difference between the transmission of the second reference signal and the uplink transmission may be less than or equal to the timing threshold, the modifying the second reference signal comprises using the precoding configuration of the first set of reference signal resources for the second set of reference signal resources.

In some examples of the method, apparatus, and non-transitory computer-readable medium described above, when the time difference between the transmission of the second reference signal and the uplink transmission may be less than or equal to the timing threshold, the modifying the second reference signal comprises dropping the transmission of the second reference signal.

In some examples of the method, apparatus, and non-transitory computer-readable medium described above, when the time difference between the transmission of the second reference signal and the uplink transmission exceeds the timing threshold, the second reference signal may be transmitted using the second set of reference signal resources.

In some examples of the method, apparatus, and non-transitory computer-readable medium described above, the first reference signal and the second reference signal may be one of an aperiodic, semi-persistent, or periodic sounding reference signal.

A method of wireless communication is described. The method may include receiving, from a UE, a first reference signal that is transmitted using a first set of reference signal resources, the first set of reference signal resources being associated with a first set of reference signal ports having a first precoding configuration applied to a set of antenna ports of the UE, selecting at least one reference signal port from the first set of reference signal ports to be used by the UE for a first uplink transmission, transmitting an uplink grant and a SRI to the UE that indicates the at least one reference signal port for the first uplink transmission, and identifying, based at least in part on the uplink grant, that a second reference signal is to be transmitted by the UE before the first uplink transmission, the second reference signal to be transmitted using a second set of reference signal resources associated with a second set of reference signal ports having a second precoding configuration applied to the set of antenna ports.

An apparatus for wireless communication is described. The apparatus may include means for receiving, from a UE, a first reference signal that is transmitted using a first set of reference signal resources, the first set of reference signal resources being associated with a first set of reference signal ports having a first precoding configuration applied to a set of antenna ports of the UE, means for selecting at least one reference signal port from the first set of reference signal ports to be used by the UE for a first uplink transmission, means for transmitting an uplink grant and a SRI to the UE that indicates the at least one reference signal port for the first uplink transmission, and means for identifying, based at least in part on the uplink grant, that a second reference signal is to be transmitted by the UE before the first uplink transmission, the second reference signal to be transmitted using a second set of reference signal resources associated with a second set of reference signal ports having a second precoding configuration applied to the set of antenna ports.

Another apparatus for wireless communication is described. The apparatus may include a processor, memory in electronic communication with the processor, and instructions stored in the memory. The instructions may be operable to cause the processor to receive, from a UE, a first reference signal that is transmitted using a first set of reference signal resources, the first set of reference signal resources being associated with a first set of reference signal ports having a first precoding configuration applied to a set of antenna ports of the UE, select at least one reference signal port from the first set of reference signal ports to be used by the UE for a first uplink transmission, transmit an uplink grant and a SRI to the UE that indicates the at least one reference signal port for the first uplink transmission, and identify, based at least in part on the uplink grant, that a second reference signal is to be transmitted by the UE before the first uplink transmission, the second reference signal to be transmitted using a second set of reference signal resources associated with a second set of reference signal ports having a second precoding configuration applied to the set of antenna ports.

A non-transitory computer-readable medium for wireless communication is described. The non-transitory computer-readable medium may include instructions operable to cause a processor to receive, from a UE, a first reference signal that is transmitted using a first set of reference signal resources, the first set of reference signal resources being associated with a first set of reference signal ports having a first precoding configuration applied to a set of antenna ports of the UE, select at least one reference signal port from the first set of reference signal ports to be used by the UE for a first uplink transmission, transmit an uplink grant and a SRI to the UE that indicates the at least one reference signal port for the first uplink transmission, and identify, based at least in part on the uplink grant, that a second reference signal is to be transmitted by the UE before the first uplink transmission, the second reference signal to be transmitted using a second set of reference signal resources associated with a second set of reference signal ports having a second precoding configuration applied to the set of antenna ports.

Some examples of the method, apparatus, and non-transitory computer-readable medium described above may further include processes, features, means, or instructions for determining that the first precoding configuration associated with the first set of reference signal resources corresponding to the at least one reference signal port will be used for the second reference signal and applying one or more parameters for receiving the second reference signal based at least in part on the determining. Some examples of the method, apparatus, and non-transitory computer-readable medium described above may further include processes, features, means, or instructions for determining that a transmission of the second reference signal will be dropped based at least in part on the transmitting the uplink grant, and refraining from monitoring for a reference signal from the UE until receiving the first uplink transmission, the refraining being based at least in part on the determining. In some examples of the method, apparatus, and non-transitory computer-readable medium described above, the modifying the one or more parameters associated with the second reference signal may include determining that the first precoding configuration will be used for the second reference signal.

In some examples of the method, apparatus, and non-transitory computer-readable medium described above, the modifying the one or more parameters associated with the second reference signal may include determining that a transmission of the second reference signal will be dropped. Some examples of the method, apparatus, and non-transitory computer-readable medium described above may further include processes, features, means, or instructions for identifying a timing threshold associated with the first uplink transmission. Some examples of the method, apparatus, and non-transitory computer-readable medium described above may further include processes, features, means, or instructions for determining that a time difference between an end of a transmission period of the second reference signal and a start of a transmission period of the first uplink transmission exceeds the timing threshold. Some examples of the method, apparatus, and non-transitory computer-readable medium described above may further include processes, features, means, or instructions for receiving the second reference signal in accordance with the second precoding configuration based at least in part on the determining.

Some examples of the method, apparatus, and non-transitory computer-readable medium described above may further include processes, features, means, or instructions for identifying a timing threshold associated with the first uplink transmission, determining that a time difference between an end of a transmission period of the second reference signal and a start of a transmission period of the first uplink transmission is less than or equal to the timing threshold, receiving the second reference signal in accordance with the first precoding configuration based at least in part on the determining.

Some examples of the method, apparatus, and non-transitory computer-readable medium described above may further include processes, features, means, or instructions for identifying a timing threshold associated with the first uplink transmission, determining that a time difference between an end of a transmission period of the second reference signal and a start of a transmission period of the first uplink transmission is less than or equal to the timing threshold, refraining from monitoring for a reference signal from the UE until receiving the first uplink transmission, the refraining being based at least in part on the determining.

In some examples of the method, apparatus, and non-transitory computer-readable medium described above, when the time difference between the transmission of the second reference signal and the first uplink transmission may be less than or equal to the timing threshold, the modifying the one or more parameters associated with the second reference signal comprises determining that the first precoding configuration will be used for the second reference signal.

In some examples of the method, apparatus, and non-transitory computer-readable medium described above, when the time difference between the transmission of the second reference signal and the first uplink transmission may be less than or equal to the timing threshold, the modifying the one or more parameters associated with the second reference signal comprises determining that the transmission of the second reference signal will be dropped.

In some examples of the method, apparatus, and non-transitory computer-readable medium described above, when the time difference between the transmission of the second reference signal and the first uplink transmission exceeds the timing threshold, the second reference signal may be transmitted using the second precoding configuration.

In some examples of the method, apparatus, and non-transitory computer-readable medium described above, the first reference signal and the second reference signal may be one of an aperiodic, semi-persistent, or periodic sounding reference signal.

A method of wireless communication is described. The method may include transmitting a first reference signal using a first set of reference signal resources, the first set of reference signal resources being associated with a first set of reference signal ports having a first precoding configuration applied to a set of antenna ports, receiving an uplink grant that indicates at least one reference signal port from the first set of reference signal ports is to be used for an uplink transmission, and determining, based at least in part on a time difference threshold associated with a timing of receiving the uplink grant, whether a subset of reference signal resources to be used for a first uplink transmission is to be selected from the first set of reference signal resources.

An apparatus for wireless communication is described. The apparatus may include means for transmitting a first reference signal using a first set of reference signal resources, the first set of reference signal resources being associated with a first set of reference signal ports having a first precoding configuration applied to a set of antenna ports, means for receiving an uplink grant that indicates at least one reference signal port from the first set of reference signal ports is to be used for an uplink transmission, and means for determining, based at least in part on a time difference threshold associated with a timing of receiving the uplink grant, whether a subset of reference signal resources to be used for a first uplink transmission is to be selected from the first set of reference signal resources.

Another apparatus for wireless communication is described. The apparatus may include a processor, memory in electronic communication with the processor, and instructions stored in the memory. The instructions may be operable to cause the processor to transmit a first reference signal using a first set of reference signal resources, the first set of reference signal resources being associated with a first set of reference signal ports having a first precoding configuration applied to a set of antenna ports, receive an uplink grant that indicates at least one reference signal port from the first set of reference signal ports is to be used for an uplink transmission, and determine, based at least in part on a time difference threshold associated with a timing of receiving the uplink grant, whether a subset of reference signal resources to be used for a first uplink transmission is to be selected from the first set of reference signal resources.

A non-transitory computer-readable medium for wireless communication is described. The non-transitory computer-readable medium may include instructions operable to cause a processor to transmit a first reference signal using a first set of reference signal resources, the first set of reference signal resources being associated with a first set of reference signal ports having a first precoding configuration applied to a set of antenna ports, receive an uplink grant that indicates at least one reference signal port from the first set of reference signal ports is to be used for an uplink transmission, and determine, based at least in part on a time difference threshold associated with a timing of receiving the uplink grant, whether a subset of reference signal resources to be used for a first uplink transmission is to be selected from the first set of reference signal resources.

Some examples of the method, apparatus, and non-transitory computer-readable medium described above may further include processes, features, means, or instructions for transmitting, after transmitting the first reference signal and before a start of the uplink grant, a second reference signal using a second set of reference signal resources, the second set of reference signal resources being associated with a second set of reference signal ports having a second precoding configuration applied to the set of antenna ports, and determining, based on the time difference threshold associated with the timing of receiving the uplink grant, that the subset of reference signal resources to be used for the first uplink transmission is selected from the first set of reference signal resources rather than the second set of reference signal resources.

Some examples of the method, apparatus, and non-transitory computer-readable medium described above may further include processes, features, means, or instructions for identifying that a second reference signal is a most recent reference signal prior to a start of a reception of the uplink grant by at least the time difference threshold, and determining, based at least in part on the time difference threshold associated with the timing of receiving the uplink grant, that the subset of reference signal resources to be used for the first uplink transmission is selected from a second set of reference signal resources.

Some examples of the method, apparatus, and non-transitory computer-readable medium described above may further include processes, features, means, or instructions for receiving, from a base station, an indication of the time difference threshold.

In some examples of the method, apparatus, and non-transitory computer-readable medium described above, the indication of the time difference threshold may be received in higher layer signaling, such as RRC signaling or a MAC-CE, prior to the transmitting the first reference signal.

In some examples of the method, apparatus, and non-transitory computer-readable medium described above, the indication of the time difference threshold may be received in control information included with the uplink grant.

In some examples of the method, apparatus, and non-transitory computer-readable medium described above, the time difference threshold may be provided in timing information associated with a SRI in the uplink grant.

In some examples of the method, apparatus, and non-transitory computer-readable medium described above, the time difference threshold may be based at least in part on an amount of time for receiving and processing the first reference signal.

In some examples of the method, apparatus, and non-transitory computer-readable medium described above, the first reference signal and the second reference signal may be one of an aperiodic, semi-persistent, or periodic sounding reference signal.

A method of wireless communication is described. The method may include receiving, from a UE, a first reference signal that is transmitted using a first set of reference signal resources, the first set of reference signal resources being associated with a first set of reference signal ports having a first precoding configuration applied to a set of antenna ports of the UE, selecting at least one reference signal port from the first set of reference signal ports to be used by the UE for a first uplink transmission, determining a timing for transmitting an uplink grant to the UE that indicates the at least one reference signal port for the first uplink transmission, the timing being based at least in part on a timing threshold, and transmitting the uplink grant to the UE according to the timing for transmitting the uplink grant to the UE.

An apparatus for wireless communication is described. The apparatus may include means for receiving, from a UE, a first reference signal that is transmitted using a first set of reference signal resources, the first set of reference signal resources being associated with a first set of reference signal ports having a first precoding configuration applied to a set of antenna ports of the UE, means for selecting at least one reference signal port from the first set of reference signal ports to be used by the UE for a first uplink transmission, means for determining a timing for transmitting an uplink grant to the UE that indicates the at least one reference signal port for the first uplink transmission, the timing being based at least in part on a timing threshold, and means for transmitting the uplink grant to the UE according to the timing for transmitting the uplink grant to the UE.

Another apparatus for wireless communication is described. The apparatus may include a processor, memory in electronic communication with the processor, and instructions stored in the memory. The instructions may be operable to cause the processor to receive, from a UE, a first reference signal that is transmitted using a first set of reference signal resources, the first set of reference signal resources being associated with a first set of reference signal ports having a first precoding configuration applied to a set of antenna ports of the UE, select at least one reference signal port from the first set of reference signal ports to be used by the UE for a first uplink transmission, determine a timing for transmitting an uplink grant to the UE that indicates the at least one reference signal port for the first uplink transmission, the timing being based at least in part on a timing threshold, and transmit the uplink grant to the UE according to the timing for transmitting the uplink grant to the UE.

A non-transitory computer-readable medium for wireless communication is described. The non-transitory computer-readable medium may include instructions operable to cause a processor to receive, from a UE, a first reference signal that is transmitted using a first set of reference signal resources, the first set of reference signal resources being associated with a first set of reference signal ports having a first precoding configuration applied to a set of antenna ports of the UE, select at least one reference signal port from the first set of reference signal ports to be used by the UE for a first uplink transmission, determine a timing for transmitting an uplink grant to the UE that indicates the at least one reference signal port for the first uplink transmission, the timing being based at least in part on a timing threshold, and transmit the uplink grant to the UE according to the timing for transmitting the uplink grant to the UE.

In some examples of the method, apparatus, and non-transitory computer-readable medium described above, the timing for transmitting the uplink grant may be less than a time duration of the timing threshold.

In some examples of the method, apparatus, and non-transitory computer-readable medium described above, the timing for transmitting the uplink grant may be no later than the timing threshold plus a time duration between a first transmission time of the first reference signal and a second transmission time of a second reference signal from the UE.

In some examples of the method, apparatus, and non-transitory computer-readable medium described above, the timing threshold may be determined based at least in part on a processing time associated with the first reference signal and a preparation time of transmitting the uplink grant.

Some examples of the method, apparatus, and non-transitory computer-readable medium described above may further include processes, features, means, or instructions for transmitting, to the UE, an indication of the timing threshold.

In some examples of the method, apparatus, and non-transitory computer-readable medium described above, the indication of the timing threshold may be transmitted in radio resource control (RRC) signaling prior to the first reference signal.

In some examples of the method, apparatus, and non-transitory computer-readable medium described above, the indication of the timing threshold may be transmitted in control information included with the uplink grant.

In some examples of the method, apparatus, and non-transitory computer-readable medium described above, the timing threshold may be a timing information associated with an SRI.

In some examples of the method, apparatus, and non-transitory computer-readable medium described above, the first reference signal may be one of an aperiodic, semi-persistent, or periodic sounding reference signal.

DETAILED DESCRIPTION

Figure 1:
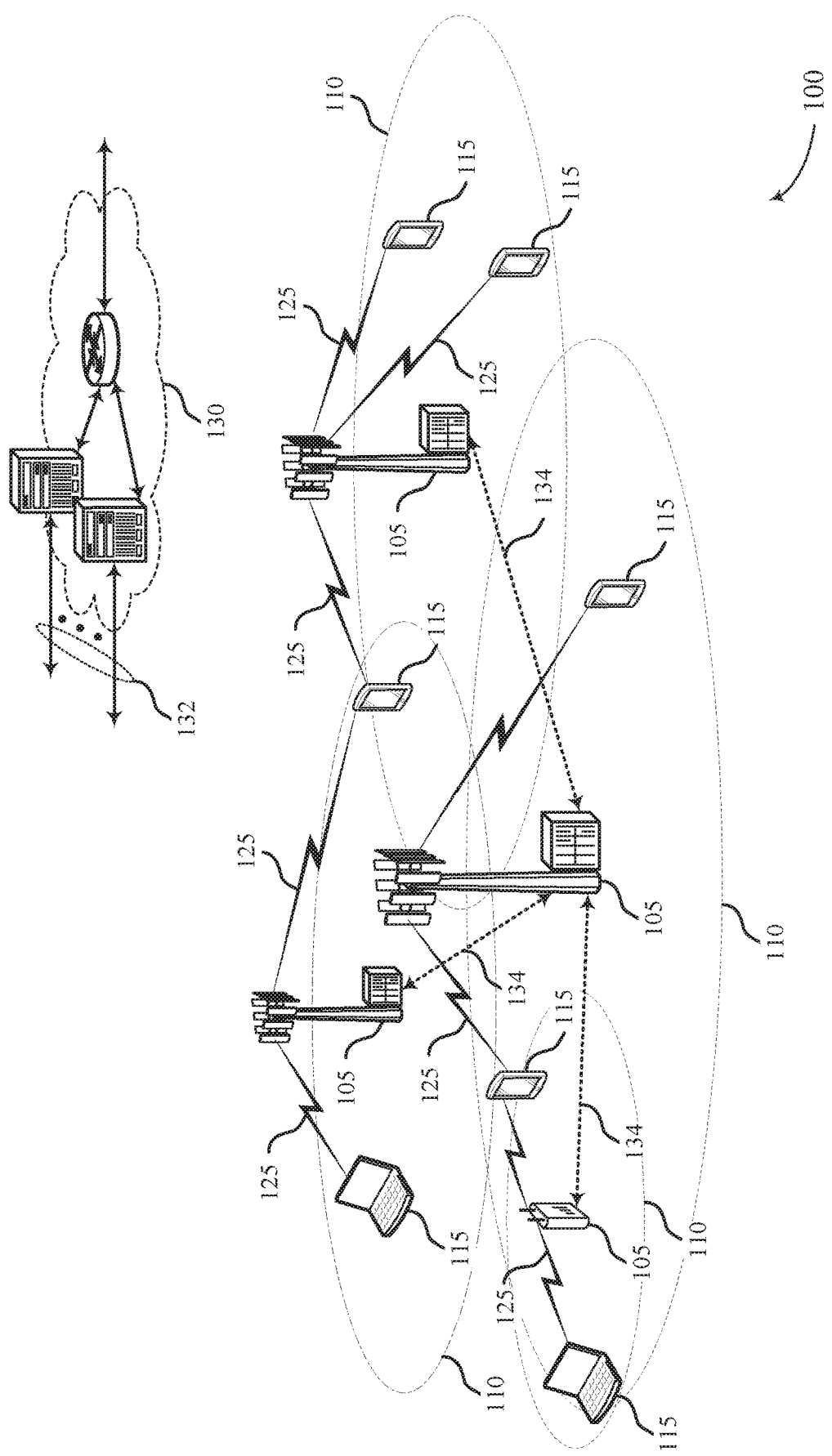
FIG. 1 illustrates an example of a system for wireless communication that supports reference resource indication techniques in wireless communications in accordance with aspects of the present disclosure.

Some wireless communications may benefit from, or rely on, estimates of channel conditions between communicating devices. By way of example, a base station may schedule resources for various UEs based on frequency-dependent information associated with each UE. Such frequency-dependent information (as well as other channel state information (CSI)) may be determined based at least in part on a channel sounding procedure. Channel sounding may refer to operations in which a UE transmits a reference signal, such as a sounding reference signal (SRS), which may be used by a base station for channel estimation. For example, a base station (or some other network access device) may configure a UE with a reference signal configuration that may include an indication of one or more use cases for the reference signal, including uplink CSI acquisition, uplink non-codebook-based precoding, downlink CSI acquisition, uplink analog beamforming, combinations thereof, etc. The timing required for the UE to perform the channel sounding procedure may be based at least in part on the use case indicated by the reference signal configuration. Techniques are described herein by which a UE and a base station may identify various parameters for reference signal transmissions and transmissions of uplink grants (or other signals to indicate transmission parameters to a UE) based at least in part on the reference signal configuration. Such techniques may provide multiple benefits to a wireless system including, for example, reduced access latency, decreased transmission interference, efficient use of a system bandwidth, or any combination thereof.

In some cases, a UE may transmit a first reference signal using a first set of reference signal resources (e.g., where the first set of reference signal resources are associated with a first set of reference signal ports having a first precoding configuration applied to a set of antenna ports), that the base station may receive and process to determine that the UE should use certain transmission parameters for an uplink transmission. In some cases, the base station may transmit an indication of the uplink transmission parameters (e.g., an indication of the precoding configuration and reference signal ports for the uplink transmission) in an uplink grant that is transmitted to the UE. In some cases, the UE may modify one or more subsequent reference signal transmissions based on the uplink grant received from the base station and a timing of the uplink grant relative to the one or more subsequent reference signal transmissions. In some cases, the base station may determine a timing for the uplink grant based on a timing associated with the reference signal transmissions from the UE.

For example, in some systems a UE may support non-codebook based precoding for uplink transmissions. In such cases, the UE may derive a precoding configuration and transmit a precoded SRS using a set of reference signal ports (e.g., using up to four antenna ports in a particular reference signal port that is formed by a corresponding precoder). A base station may receive the SRS and perform channel estimation based on the SRS. Based on the channel estimation, the base station may select one or more preferred SRS resources/ports for one or more subsequent uplink transmissions and provide an indication of the selected SRS resources/ports, such as in a SRS resource indicator (SRI), that may be provided to the UE along with an uplink grant for a subsequent uplink transmission. The UE may receive the indication and transmit the subsequent uplink transmission using the precoding configuration and reference signal ports indicated by the base station.

In some cases, the UE may be configured for periodic SRS transmissions, and consecutive SRS transmissions may use different precoding configurations, different reference signal ports, or combinations thereof. In some cases, if a periodic SRS is to be transmitted using a different precoding configuration and reference signal ports (e.g., based on an SRS configuration at the UE) than an uplink transmission that follows the SRS transmission (e.g., that may be based on a prior SRS and associated SRI provided by the base station), the UE may have insufficient time to perform switching of the transmission parameters. In such cases, various aspects of the present disclosure provide techniques for modifying such an SRS transmission that occurs between receiving an uplink grant and transmitting the associated uplink transmission.

Furthermore, in some cases the timing of periodic SRS transmissions may result in ambiguity with respect to which particular SRS transmission was used to derive the indication provided by the base station. For example, if a UE transmits a first SRS and a second SRS before receiving an uplink grant with an SRI, the second SRS may be transmitted after the base station has performed channel estimation and selected an SRI for a subsequent uplink transmission. In such cases, various aspects of the present disclosure provide techniques for determining a timing for providing the uplink grant for the uplink transmission and for determining by the UE of which SRS transmission was used in determining the SRI. In some cases, various combinations of techniques described here may be used in conjunction with each other.

Aspects of the disclosure are initially described in the context of a wireless communications system. Various examples of timings of reference signal transmissions and resource grant transmissions are then discussed for several examples. Aspects of the disclosure are further illustrated by and described with reference to process flows, apparatus diagrams, system diagrams, and flowcharts that relate to reference resource indication techniques in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may use reference signal timing, modification, and resource indication techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation). The adjustments associated with each of the antenna elements may be derived from a precoding configuration, in some cases.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Some of the operations described herein (e.g., MIMO communications, resource scheduling, etc.) may benefit from or rely on channel sounding procedures by which a base station 105 obtains estimates of the channel between itself and various UEs 115. For example, a NR system may support SRS resources that span one, two, or four adjacent symbols with up to four antenna ports per SRS resource (e.g., where all ports of an SRS resource are sounded in each of the adjacent symbols). The SRS resource may be scheduled in time aperiodically (e.g., based on downlink control information (DCI) signaling), semi-persistently or periodically (e.g., based on configurations provided by radio resource control (RRC) signaling), or some combination thereof. The SRS transmission may be wideband (e.g., across a system bandwidth) or sub-band-specific. In some cases, the SRS bandwidth may be a multiple of four PRBs (e.g., four PRBs, eight PRBs, 12 PRBs, etc.).

In some cases, a UE 115 may transmit a first reference signal (e.g., a first SRS) using a first set of reference signal resources (e.g., where the first set of reference signal resources are associated with a first set of reference signal ports having a first precoding configuration applied to a set of antenna ports), that a base station 105 may receive and process to determine that the UE 115 should use certain transmission parameters for an uplink transmission. In some cases, the base station 105 may transmit an indication of the uplink transmission parameters (e.g., an indication of the precoding configuration and reference signal ports for the uplink transmission) in an uplink grant that is transmitted to the UE 115. In some cases, the UE 115 may modify one or more subsequent reference signal transmissions based on the uplink grant received from the base station and a timing of the uplink grant relative to the one or more subsequent reference signal transmissions. In some cases, the base station 105 may determine an uplink grant timing based on a timing associated with the reference signal transmissions from the UE 115, and the UE 115 may determine which of multiple reference signal transmissions the uplink grant is based on based on the uplink grant timing relative to the timing of the reference signal transmissions.

Figure 2:
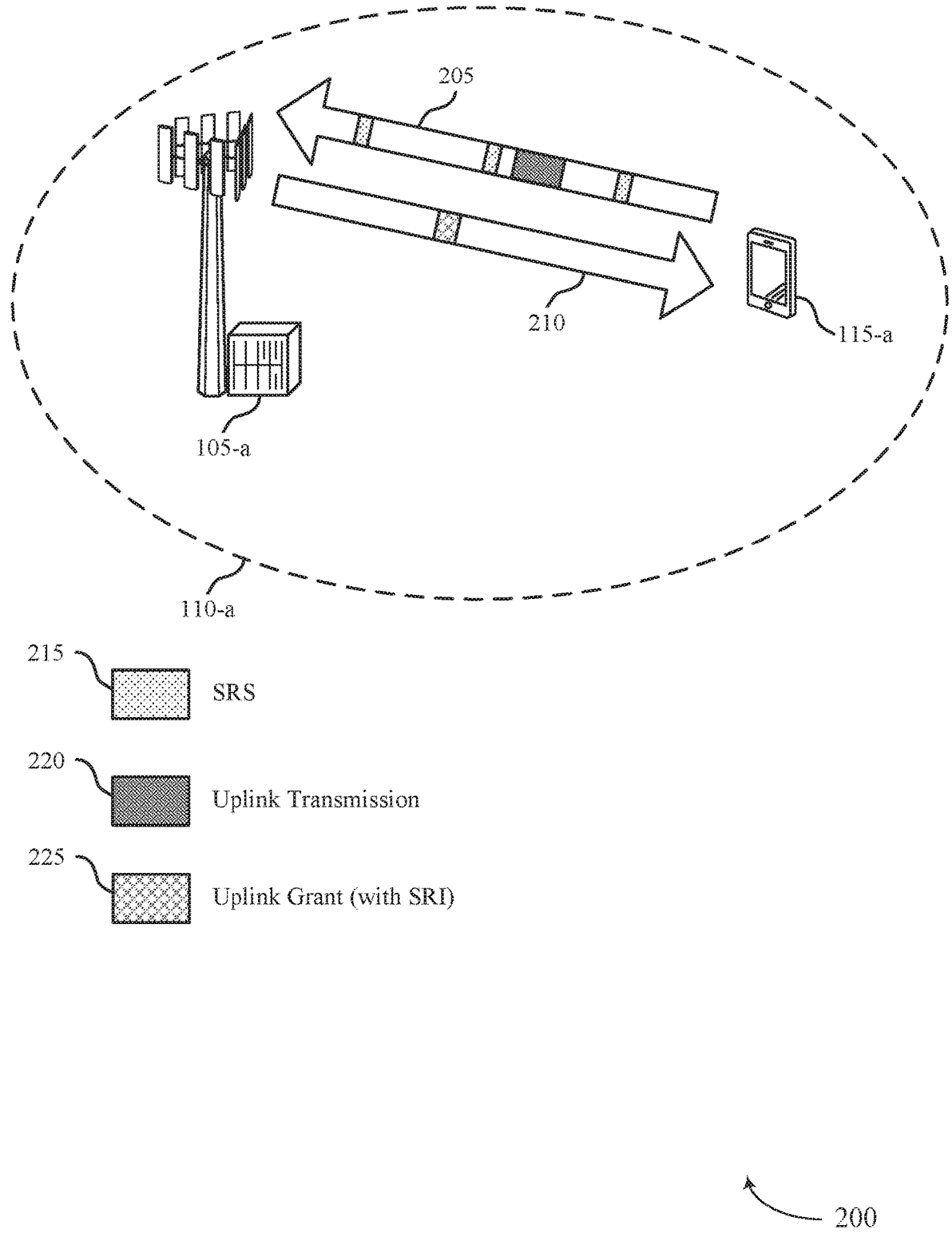
FIG. 2 illustrates an example of a portion of a wireless communication system that supports reference resource indication techniques in wireless communications in accordance with aspects of the present disclosure.

FIG. 2 illustrates an example of a portion of a wireless communication system 200 that supports reference resource indication techniques in wireless communications in accordance with various aspects of the present disclosure. In some examples, wireless communication system 200 may implement aspects of wireless communication system 100. In the example of FIG. 2, the wireless communication system 200 may include a base station 105-a, which may be an example of a base station 105 of FIG. 1. The wireless communication system 200 may also include a UE 115-a, which may be an example of a UE 115 of FIG. 1, that is located within coverage area 110-a of the base station 105-a.

In the example of FIG. 2, the base station 105-a and the UE 115-a may establish a connection that supports uplink transmissions 205 and downlink transmissions 210. The base station 105-a may schedule resources for the UE 115-a, which may include resources that may be used by the UE 115-a for transmitting a reference signal, such as SRS 215, which may be used by a base station 105-a for channel estimation. As indicated herein, in some cases, the base station 105-a may configure the UE 115-a with a reference signal configuration that may include an indication of one or more use cases for the reference signal, including uplink CSI acquisition, uplink non-codebook-based precoding, downlink CSI acquisition, uplink analog beamforming, combinations thereof, etc.

For example, in cases where the UE 115-a is configured for non-codebook-based precoding, the base station 105-a may configure periodic transmissions of SRS 215. The base station 105-a may transmit an uplink grant 225 to the UE 115-a, that may include an indication of resources and precoding configuration that the UE 115-a is to use for an uplink transmission 220. According to some examples, the UE 115-a may transmit a first SRS 215 using a first set of reference signal resources (e.g., where the first set of reference signal resources are associated with a first set of reference signal ports having a first precoding configuration applied to a set of antenna ports), that the base station 105-a may receive and process to determine that the UE 115-a should use certain transmission parameters for the uplink transmission 220. In some cases, the base station 105-a may transmit an indication of the uplink transmission parameters (e.g., an SRI that indicates the reference signal ports for the uplink transmission, and thus implicitly indicates the precoding configuration, because based on the preferred SRS ports, the UE can know the corresponding precoder to be used in the uplink transmission) in the uplink grant 225. As indicated herein, the timing of one or more other of the SRS 215 transmissions may result in potential ambiguity in which parameters are to be used for the uplink transmission 220 or which SRS 215 transmission the indication in the uplink grant 225 applies to. According to some techniques discussed herein, the UE 115-a may modify one or more SRS 215 transmissions that occur between the uplink grant 225 and the uplink transmission 220. Additionally or alternatively, a timing of the uplink grant 225 relative to the one or more SRS 215 transmissions may be determined based on a timing associated with the SRS 215 transmissions. Several examples related to SRS modification, uplink grant timing, and determination of which SRS an SRI applies to are discussed with respect to FIGS. 3-6.

Figure 3:
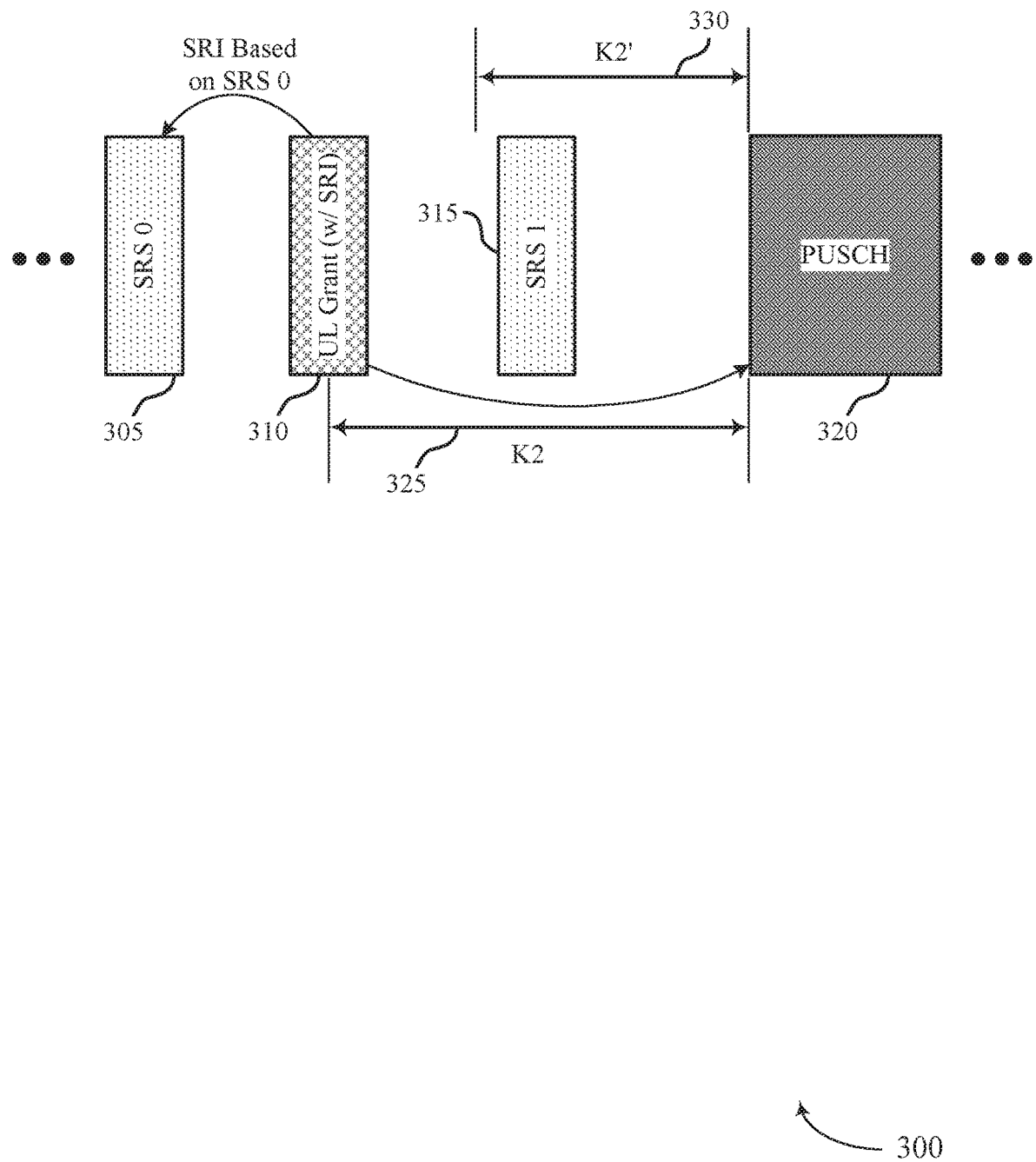
FIG. 3 illustrates an example of a transmission timing that supports reference resource indication techniques in wireless communications in accordance with aspects of the present disclosure.

FIG. 3 illustrates an example of a transmission timing 300 that supports reference resource indication techniques in wireless communications in accordance with various aspects of the present disclosure. In some examples, transmission timing 300 may be implemented in aspects of wireless communication system 100 or 200. In the example of FIG. 3, a first SRS 305 (SRS-0) may be transmitted by a UE and may be received at a base station. The base station may perform channel estimation based on the first SRS 305, and derive a SRI that may indicate which antenna ports, resources, and precoding configuration is preferred by the base station based on the first SRS 305. The base station may transmit uplink grant 310, with the SRI, to the UE. In some cases, the timing of the uplink grant 310 may be determined based on SRS timing, the processing time for SRS, the preparation time for transmitting the uplink grant, or combinations thereof, as will be discussed in more detail below with respect to FIG. 4.

In the example of FIG. 3, a second SRS 315 (SRS-1) may be transmitted following the uplink grant 310, but before the start of the uplink transmission 320 (e.g., physical uplink shared channel (PUSCH) transmission) that is allocated in the uplink grant 310. As indicated herein, in some cases, the second SRS 315 may be transmitted using different precoding and reference signal ports than the first SRS 305. Furthermore, because the SRI of the uplink grant 310 is based on the first SRS 305, the precoding configuration and reference signal ports for the uplink transmission 320 will be determined based on the precoding configuration and reference signal ports of the first SRS 305. The UE may thus need to switch precoding configurations and reference signal ports, and may not have sufficient time between the second SRS 315 and the uplink transmission 320 to do so.

According to various techniques provided herein, the second SRS 315 may be modified in such situations. In this example, a first time period 325 is defined between the uplink grant 310 and the start of the uplink transmission 320, which may correspond to K2 slots for example. In some cases, when the UE is configured for transmission in a non-codebook based transmission mode, and one or more SRS (e.g., the second SRS 315) is scheduled in the time period 325 before the uplink grant 310, the UE may modify the second SRS 315 to use the same precoding configuration as the first SRS 305. In other cases, the UE may modify the second SRS 315 by dropping the second SRS 315 and any other SRS that is scheduled within the time period 325.

In other examples, a timing threshold 330 may be defined, as denoted by K2', before the start of the uplink transmission 320. The timing threshold 330 may correspond to, for example, a switching time for the UE to change precoding and reference signal port configurations. In such cases, if the second SRS 315 is scheduled prior to a start of the timing threshold 330, the UE may transmit the second SRS 315 with no modifications. If the second SRS 315 is scheduled after the start of the timing threshold 330, the UE may modify the second SRS 315, such as by not updating the precoder from the first SRS 305 transmission, or by dropping the second SRS 315.

Figure 4:
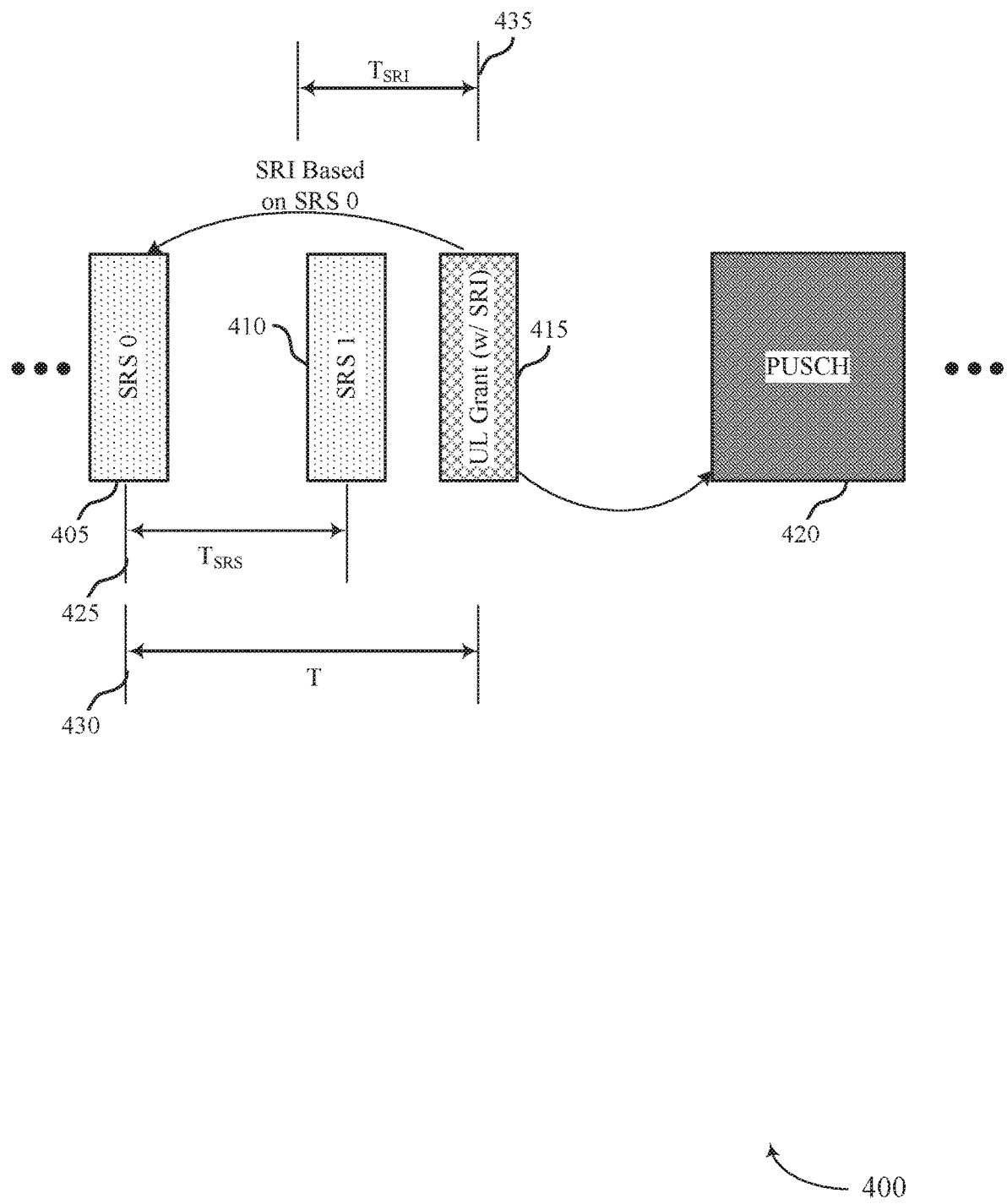
FIG. 4 illustrates another example of a transmission timing that supports reference resource indication techniques in wireless communications in accordance with aspects of the present disclosure.

FIG. 4 illustrates an example of a transmission timing 400 that supports reference resource indication techniques in wireless communications in accordance with various aspects of the present disclosure. In some examples, transmission timing 400 may be implemented in aspects of wireless communication system 100 or 200. In the example of FIG. 4, a first SRS 405 (SRS-0) may be transmitted by a UE and may be received at a base station. After transmitting the first SRS 405, the UE may transmit a second SRS 410 (SRS-1), according to a configured SRS transmission timing that may provide periodic SRS transmissions at a time $T_{SRS}$ 425. The base station may perform channel estimation using the first SRS 405, and derive a SRI that may be transmitted in uplink grant 415. The uplink grant 415 may include an allocation of uplink resources for uplink transmission 420 (e.g., a PUSCH transmission). The time between the resource of the first SRS 405 and the uplink grant 415 is indicated in FIG. 4 as time T 430.

As indicated herein, the base station may perform channel estimation using the first SRS 405, compute the preferred SRS resource/ports, allocate uplink resources for the uplink transmission 420, and prepare the uplink grant 415 for transmission to the UE. Such operations may take a certain amount of time, and in the event that the second SRS 410 is transmitted within that amount of time, the UE may not assume that the SRI in the uplink grant 415 refers to the second SRS 410. According to various aspects of the present disclosure, the base station in such situations may configure a minimum timing between the reference resource of the first SRS 405 and the time of the uplink grant 415, which is denoted as $T_{SRI}$ 435 in FIG. 4. In such cases, the base station may determining a timing for the transmission of the uplink grant 415 such that the associated SRI is transmitted at a time that is at least $T_{SRI}$ 435 (inclusive) later than the reference resource of the first SRS 405, but no more than $T_{SRI}+T_{SRS}$ (exclusive) later than the reference resource of the first SRS 405 (i.e., $T_{SRI} \leq T < T_{SRI}+T_{SRS}$). In such cases, the UE may determine that the SRI in the uplink grant 415 is associated with the most recent SRS that occurred before the time $T_{SRI}$ 435 (inclusive) prior to the uplink grant 415. In some cases, the value of $T_{SRI}$ may be configured by the base station (e.g., via RRC signaling) or such a value may be preconfigured. In some cases, the value of $T_{SRI}$ may be dynamically indicated together with the SRI indication in the uplink grant 415. In the examples of FIGS. 3 and 4, all the timing may be in the ODFM symbol level, slot level, or in real-time scale. Additionally, the SRS transmissions may be any type of periodic SRS transmissions, semi-persistent SRS transmissions, aperiodic SRS transmissions, or combination thereof. In cases where one or more SRS transmissions are aperiodic, there may be an aperiodic trigger before the SRS.

Figure 5:
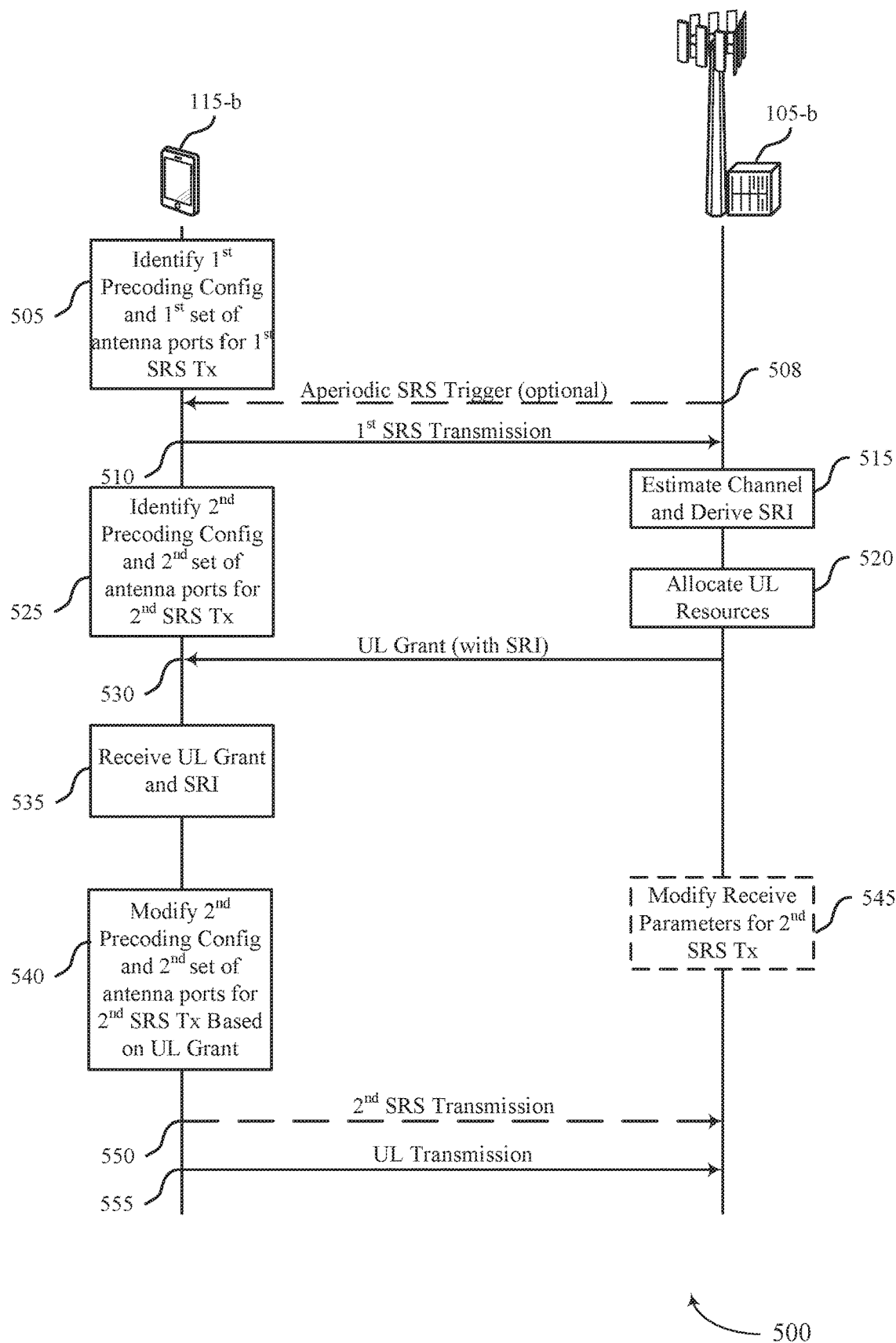
FIG. 5 illustrates an example of a process flow that supports reference resource indication techniques in wireless communications in accordance with aspects of the present disclosure.

FIG. 5 illustrates an example of a process flow 500 that supports reference resource indication techniques in wireless communications in accordance with various aspects of the present disclosure. In some examples, process flow 500 may be implemented in aspects of wireless communication system 100 or 200. The base station 105-*b* may be an example of a base station 105 of FIG. 1 or 2, and the UE 115-*b* may be an example of a UE 115 of FIG. 1 or 2.

At 505, the UE 115-*b* may identify a first precoding configuration and a first set of reference signal ports for a first SRS transmission 510. As discussed herein, the base station 105-*b* may, in some cases, configure the UE 115-*b* for non-codebook uplink transmissions, and the UE 115-*b* may transmit periodic SRS transmissions, semi-persistent SRS transmissions, aperiodic SRS transmissions, or combination thereof, that may be used for channel estimation at the base station 105-*b*. In cases the first SRS transmission 510 is aperiodic, the base station 105-*b* may transmit aperiodic SRS trigger 508.

At 515, the base station 105-*b* may perform channel estimation based on the first SRS transmission 510, and derive a SRI for a subsequent uplink transmission. In some cases, the base station 105-*b* may derive the SRI to indicate a subset of ports/resources that were used for the first SRS transmission 510. In some cases, the SRI may be an index into an ordered list of ports/resources used for SRS transmissions, that may be used by the UE 115-*b* to determine a subset of ports/resources that were used for a SRS transmission that are to be used for a subsequent uplink transmission.

At 520, the base station may allocate uplink resources for a subsequent uplink transmission. In some cases, the uplink resources may be allocated based on the SRI that was determined from the first SRS transmission 510. In some cases, the uplink resources and an indication of the SRI may be formatted into an uplink grant 530 that may be transmitted to the UE 115-*b*.

At 525, the UE 115-*b* may identify a second precoding configuration and a second set of reference signal ports for a second SRS transmission. As discussed herein, in some cases, the UE 115-*b* may be configured for periodic SRS transmissions, and the UE 115-*b* may identify parameters associated with such a subsequent SRS based on a timing for the periodic SRS transmissions.

At 535, the UE 115-*b* may receive the uplink grant and SRI. The uplink grant and SRI may include, as discussed herein, an indication uplink resources for a subsequent uplink transmission, and the SRI may indicate a precoding configuration and antenna ports to be used for the uplink transmission. In this case, since no intervening SRS was transmitted between the first SRS transmission 510 and the uplink grant 530, the UE 115-*b* may identify that the SRI refers to the first SRS transmission 510 and determine the precoding configuration and antenna ports based on the first SRS transmission 510.

At 540, the UE 115-*b* may modify the second precoding configuration and second set of antenna ports for the second SRS transmission based on the uplink grant 530. As discussed herein, in some cases, the UE 115-*b* may have insufficient time between a scheduled transmission of the second SRS transmission and the uplink transmission to reconfigure its precoding configuration and antenna ports. In such cases, the second SRS may be modified by, for example, dropping the second SRS or by maintaining the precoding configuration and antenna ports of the first SRS transmission 510 for use with second SRS transmission 550. In some cases, such modifications may be based on a timing threshold and a timing between the second SRS transmission 550 and the subsequent uplink transmission 555.

The base station 105-*b* optionally may, at 545, apply or modify one or more receive parameters for the second SRS transmission. Such modification of the receive parameters may be made to enhance reception of the second SRS transmission and may correspond to the modifications that are made at the UE 115-*b*. In cases where the second SRS transmission 550 is dropped, the base station 105-*b* may reallocate the associated resources, or not monitor for the second SRS transmission 550.

Figure 6:
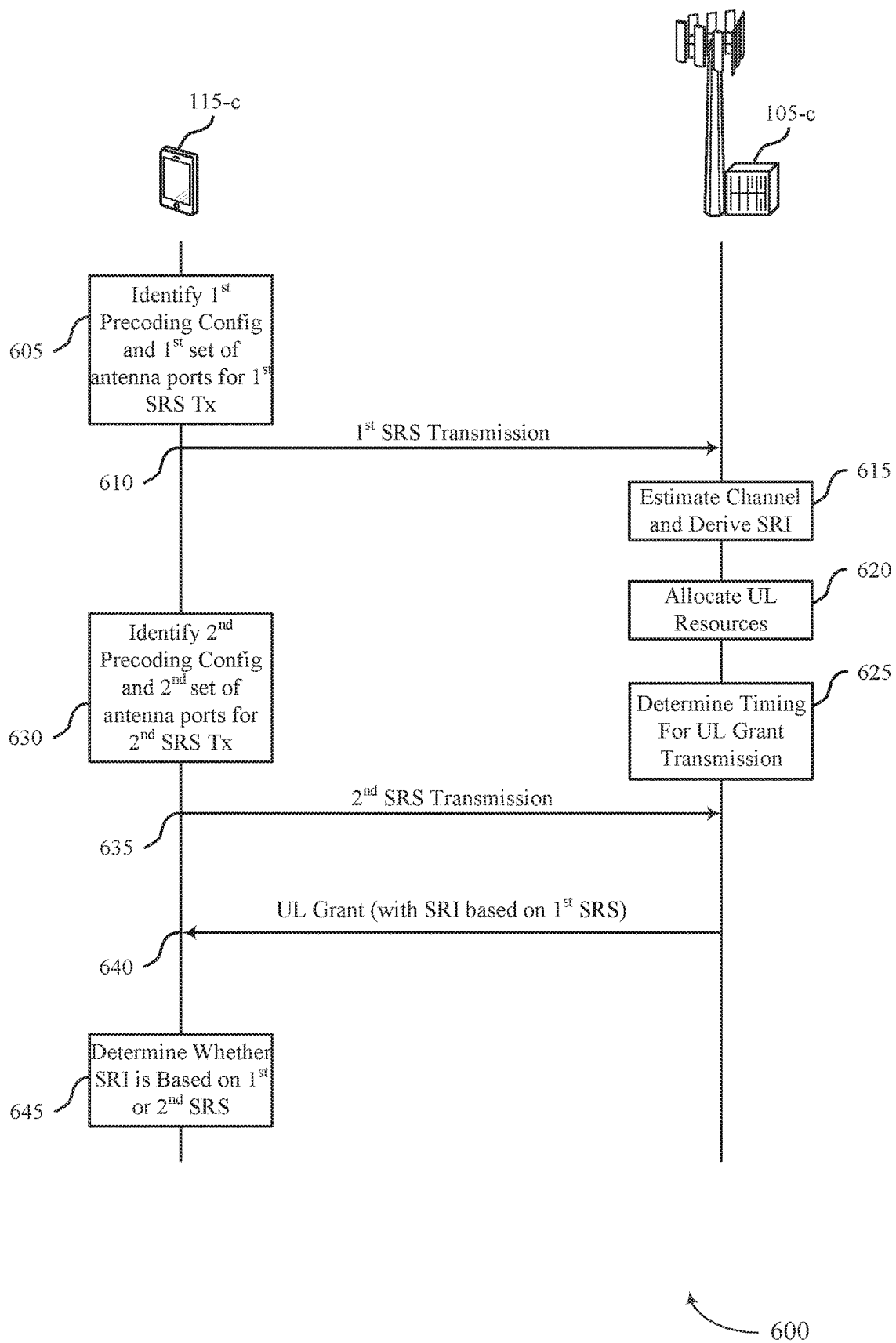
FIG. 6 illustrates another example of a process flow that supports reference resource indication techniques in wireless communications in accordance with aspects of the present disclosure.

FIG. 6 illustrates an example of a process flow 600 that supports reference resource indication techniques in wireless communications in accordance with various aspects of the present disclosure. In some examples, process flow 600 may be implemented in aspects of wireless communication system 100 or 200. The base station 105-*c* may be an example of a base station 105 of FIG. 1 or 2, and the UE 115-*c* may be an example of a UE 115 of FIG. 1 or 2.

At 605, the UE 115-*c* may identify a first precoding configuration and a first set of antenna ports for a first SRS transmission 610. As discussed herein, the base station 105-*c* may, in some cases, configure the UE 115-*c* for non-codebook uplink transmissions, and the UE 115-*c* may transmit periodic SRS transmissions that may be used for channel estimation at the base station 105-*c*. While periodic SRS transmissions are illustrated in FIG. 6, aperiodic or semi-persistent SRS transmission, or combinations thereof, may also be configured at the UE 115-*c*.

At 615, the base station 105-*c* may perform channel estimation based on the first SRS transmission 610, and derive a SRI for a subsequent uplink transmission. In some cases, the base station 105-*c* may derive the SRI to indicate a subset of ports/resources that were used for the first SRS transmission 610. In some cases, the SRI may be an index into an ordered list of ports/resources used for SRS transmissions, that may be used by the UE 115-*c* to determine a subset of ports/resources that were used for a SRS transmission that are to be used for a subsequent uplink transmission.

At 620, the base station may allocate uplink resources for a subsequent uplink transmission. In some cases, the uplink resources may be allocated based on the SRI that was determined from the first SRS transmission 610. In some cases, the uplink resources and an indication of the SRI may be formatted into an uplink grant 630 that may be transmitted to the UE 115-*c*.

At 625, the base station 105-*c* may determine a timing for an uplink grant transmission. As discussed herein, in some cases the timing for the uplink grant may be determined based on a timing threshold ($T_{SRI}$) such that the uplink grant is transmitted at least $T_{SRI}$ later than the reference resource of the first SRS transmission 610, but no more than $T_{SRI}$+ $T_{SRS}$ later than the reference resource of the first SRS transmission 610 (i.e., $T_{SRI} \leq T < T_{SRI}+T_{SRS}$). In some cases, the timing threshold is determined based at least in part on a processing time associated with the first SRS transmission 610 and a preparation time of the base station 105-*c* for channel estimation and transmission of the uplink grant. In some cases, the timing threshold may be preconfigured (e.g., in a specification), and may be known by the base station 105-*c* and the UE 115-*c*. In other cases, a set of candidate timing thresholds may be configured via higher layer signaling (e.g., via RRC signaling or in a medium access control (MAC) control element, prior to the initiation of any SRS transmissions), and DCI may indicate a specific value in the set (and may be provided together with the uplink grant). In other cases, the timing threshold may be dynamically indicated along with the SRI.

At 630, the UE 115-*c* may identify a second precoding configuration and a second set of antenna ports for a second SRS transmission 635. As discussed herein, in some cases, the UE 115-*c* may be configured for periodic SRS transmissions, and the UE 115-*c* may identify parameters associated with such a subsequent SRS based on a timing for the periodic SRS transmissions.

The base station 105-*c* may, after the second SRS transmission 635, transmit the uplink grant 640 to the UE 115-*c*. The uplink grant 640 may include an SRI that is based on the first SRS transmission 610, as discussed herein.

At 645, the UE 115-*c* may determine whether the SRI in the uplink grant 640 is based on the first SRS transmission 610 or the second SRS transmission 635. In some cases, the UE 115-*c* may make such a determination based on the timing threshold and whether the second SRS transmission 635 occurred before or after the timing threshold.

Figure 7:
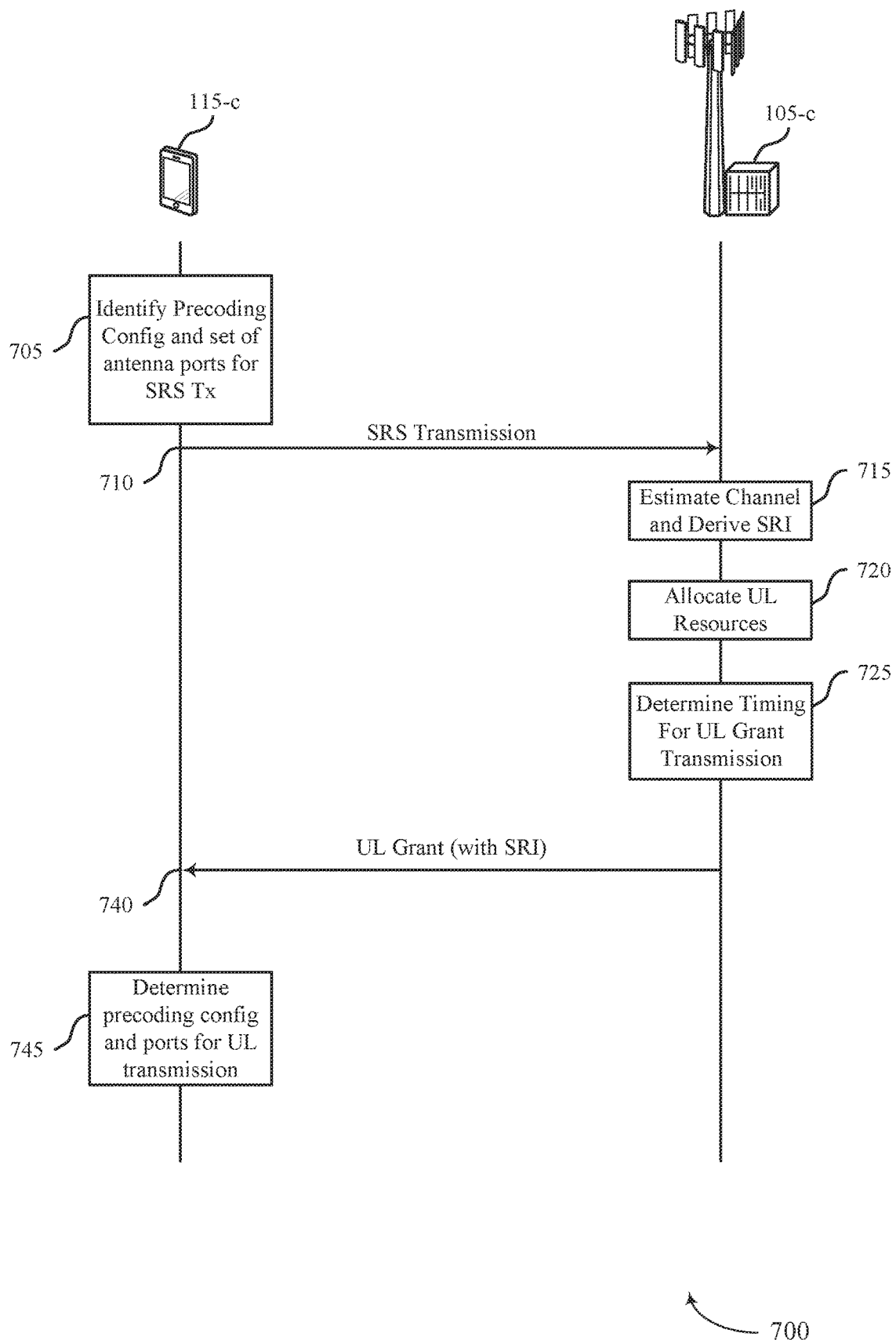
FIG. 7 illustrates another example of a process flow that supports reference resource indication techniques in wireless communications in accordance with aspects of the present disclosure.

FIG. 7 illustrates another example of a process flow 700 that supports reference resource indication techniques in wireless communications in accordance with various aspects of the present disclosure. In some examples, process flow 700 may be implemented in aspects of wireless communication system 100 or 200. The base station 105-d may be an example of a base station 105 of FIG. 1 or 2, and the UE 115-d may be an example of a UE 115 of FIG. 1 or 2. Process flow 600 is similar to process flow 600, but without a second SRS transmission.

In this example, at 705 the UE 115-d may identify a precoding configuration and a set of antenna ports for a SRS transmission 710. As discussed herein, the base station 105-d may, in some cases, configure the UE 115-d for non-codebook uplink transmissions, and the UE 115-d may transmit periodic SRS transmissions that may be used for channel estimation at the base station 105-d. While periodic SRS transmissions are illustrated in FIG. 7, aperiodic or semi-persistent SRS transmission, or combinations thereof, may also be configured at the UE 115-d.

At 715, the base station 105-d may perform channel estimation based on the SRS transmission 710, and derive a SRI for a subsequent uplink transmission. In some cases, the base station 105-d may derive the SRI to indicate a subset of ports/resources that were used for the SRS transmission 710. In some cases, the SRI may be an index into an ordered list of ports/resources used for SRS transmissions, that may be used by the UE 115-d to determine a subset of ports/resources that were used for a SRS transmission that are to be used for a subsequent uplink transmission.

At 720, the base station may allocate uplink resources for a subsequent uplink transmission. In some cases, the uplink resources may be allocated based on the SRI that was determined from the SRS transmission 710. In some cases, the uplink resources and an indication of the SRI may be formatted into an uplink grant 730 that may be transmitted to the UE 115-d.

At 725, the base station 105-d may determine a timing for an uplink grant transmission. As discussed herein, in some cases the timing for the uplink grant may be determined based on a timing threshold ($T_{SRI}$) such that the uplink grant is transmitted at least $T_{SRI}$ later than the reference resource of the SRS transmission 710, but no more than $T_{SRI}+T_{SRS}$ later than the reference resource of the SRS transmission 710 (i.e., $T_{SRI} \leq T < T_{SRI}+T_{SRS}$). In some cases, the timing threshold is determined based at least in part on a processing time associated with the SRS transmission 710 and a preparation time of the base station 105-d for channel estimation and transmission of the uplink grant. The base station 105-d may transmit the uplink grant 740 to the UE 115-d. The uplink grant 740 may include an SRI that is based on the SRS transmission 710, as discussed herein.

At 745, the UE 115-d may receive the uplink grant 740 and SRI, and determine a precoding configuration and antenna ports for the subsequent uplink transmission.

Figure 8:
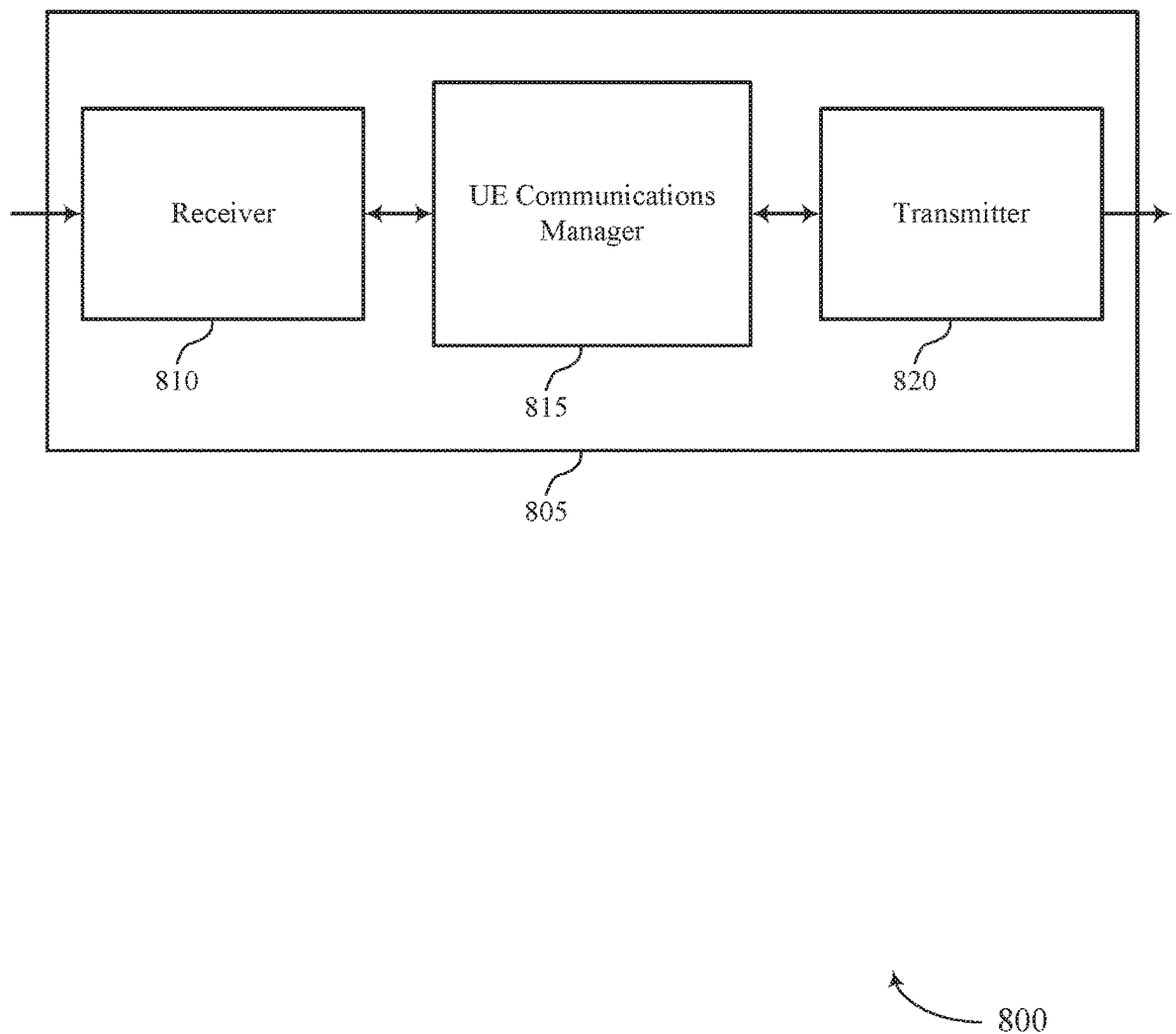
FIGS. 8 through 10 show block diagrams of a device that supports reference resource indication techniques in wireless communications in accordance with aspects of the present disclosure.

FIG. 8 shows a block diagram 800 of a wireless device 805 that supports reference resource indication techniques in wireless communications in accordance with aspects of the present disclosure. Wireless device 805 may be an example of aspects of a user equipment (UE) 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to reference resource indication techniques in wireless communications, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may transmit a first reference signal using a first set of reference signal resources, the first set of reference signal resources associated with a first set of reference signal ports having a first precoding configuration applied to a set of antenna ports, receive an uplink grant and an SRI that indicates at least one reference signal port from the first set of reference signal ports (e.g., a first subset) associated with the first set of reference signal resources is to be used for an uplink transmission, identify that a second reference signal is to be transmitted after receiving the uplink grant and before the uplink transmission, the second reference signal associated with a second set of reference signal resources, and modify the second reference signal based on the receiving the uplink grant.

The UE communications manager 815 may also transmit, at a first time, a first reference signal using a first set of reference signal resources, the first set of reference signal resources associated with a first set of reference signal ports having a first precoding configuration applied to a set of antenna ports, transmit, at a second time, a second reference signal using a second set of reference signal resources, the second set of reference signal resources associated with a second set of reference signal ports having a second precoding configuration applied to the set of antenna ports, receive, at a third time, an uplink grant that indicates a subset of reference signal resources to be used for a first uplink transmission, and determine, based on a time difference threshold between the third time and the second time, whether the subset of reference signal resources to be used for the first uplink transmission is selected from the first set of reference signal resources or the second set of reference signal resources.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
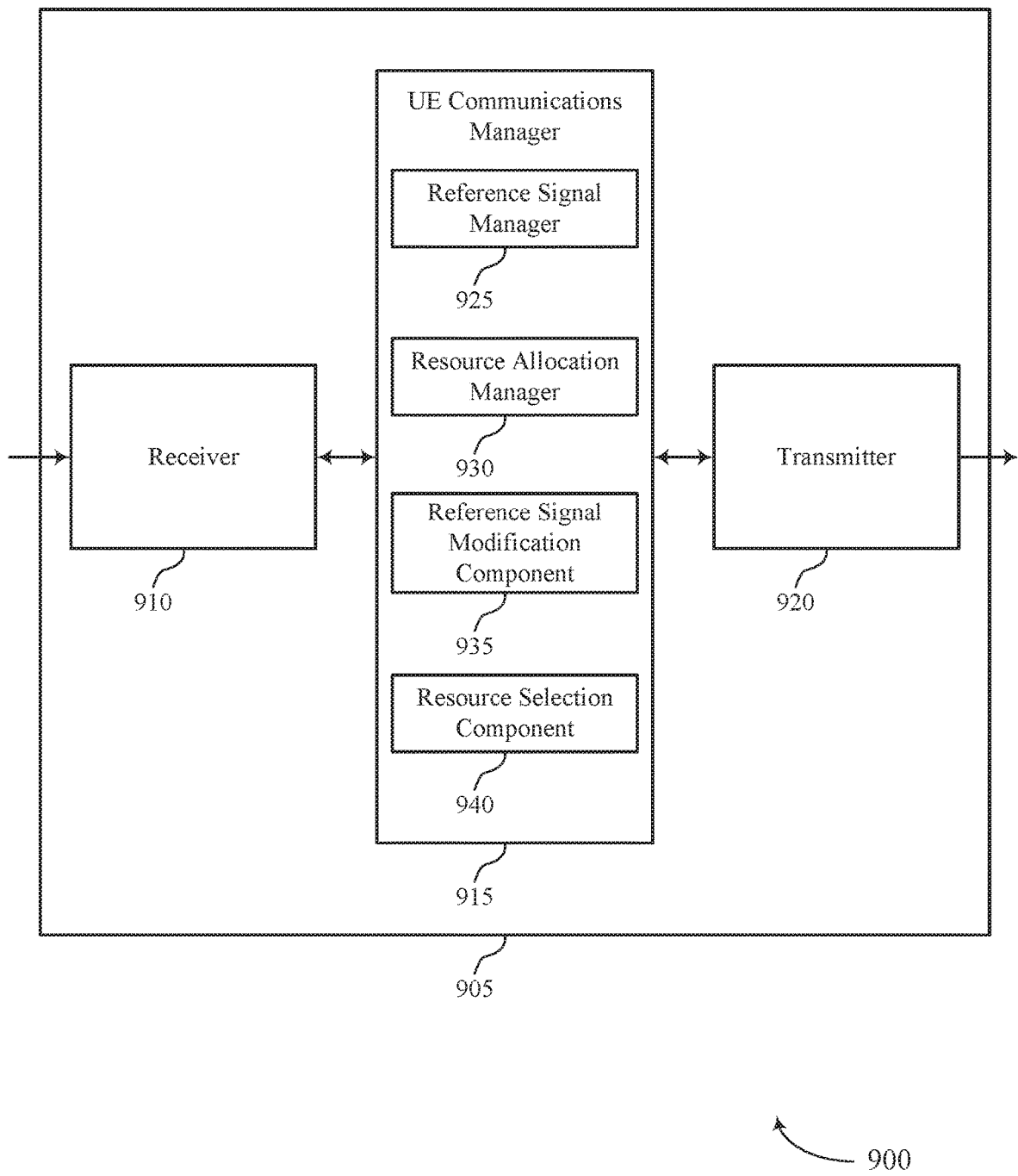

FIG. 9 shows a block diagram 900 of a wireless device 905 that supports reference resource indication techniques in wireless communications in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to reference resource indication techniques in wireless communications, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include reference signal manager 925, resource allocation manager 930, reference signal modification component 935, and resource selection component 940.

Reference signal manager 925 may transmit a first reference signal using a first set of reference signal resources, the first set of reference signal resources associated with a first set of reference signal ports having a first precoding configuration applied to a set of antenna ports. In some cases, reference signal manager 925 may identify that a second reference signal is to be transmitted after receiving an uplink grant and before an associated uplink transmission, the second reference signal associated with a second set of reference signal resources. In some cases, the second set of reference signal resources include a second precoding configuration and a second set of antenna ports. In some cases, the first reference signal and the second reference signal are one of an aperiodic, semi-persistent, or periodic SRS.

Resource allocation manager 930 may receive an uplink grant and a SRI that indicates at least one reference signal port from the first set of reference signal ports (e.g., a first subset) associated with the first set of reference signal resources is to be used for an uplink transmission. In some cases, resource allocation manager 930 may identify allocated uplink resources from the uplink grant and configure an uplink transmission based on the allocated resources.

Reference signal modification component 935 may, in some cases, modify the second reference signal based on receiving an uplink grant. In some cases, when the time difference between the transmission of the second reference signal and the uplink transmission is less than or equal to a timing threshold, the second reference signal may be modified to use the precoding configuration of the first set of reference signal resources rather than the second set of reference signal resources. In some cases, when the time difference between the transmission of the second reference signal and the uplink transmission is less than or equal to the timing threshold, the second reference signal may be modified by dropping the transmission of the second reference signal. In some cases, when the time difference between the transmission of the second reference signal and the uplink transmission exceeds the timing threshold, the second reference signal is transmitted using the second set of reference signal resources. In some cases, the modifying the second reference signal includes using the precoding configuration of the first set of reference signal resources for the second set of reference signal resources. That is, in some cases, first precoding configuration corresponding to the reference signal port indicated in the SRI is used for the second set of reference signal resources. In some cases, the modifying the second reference signal (e.g., a modification of the second reference signal prior to transmission via an antenna) includes dropping the transmission of the second reference signal. The dropping the transmission of the second reference signal can be referred to as a modification of the use of the second set of reference signal resources. For example, the reference signal modification component 935 does not apply the second reference signal for transmission via the second set of reference signal resources.

Resource selection component 940 may determine, based on a time difference threshold between an uplink grant and a reference signal transmission, whether the subset of reference signal resources to be used for a first uplink transmission is selected from the first set of reference signal resources or the second set of reference signal resources. In some cases, the time difference threshold is based on an amount of time for receiving and processing the first reference signal.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
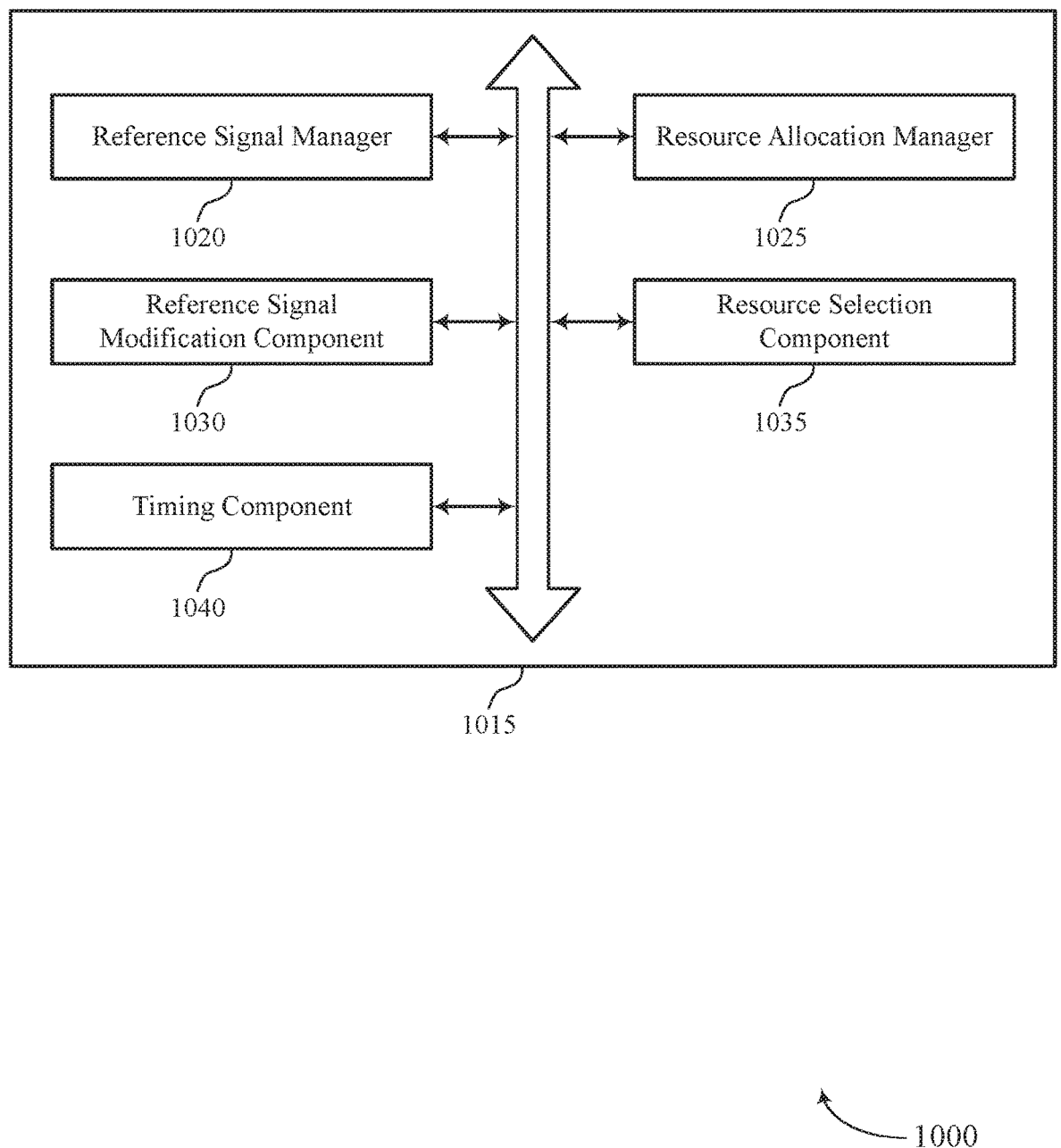

FIG. 10 shows a block diagram 1000 of a UE communications manager 1015 that supports reference resource indication techniques in wireless communications in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include reference signal manager 1020, resource allocation manager 1025, reference signal modification component 1030, resource selection component 1035, and timing component 1040. Each of these modules may communicate, directly or indirectly, with one another (e.g., via one or more buses).

Reference signal manager 1020 may transmit a first reference signal using a first set of reference signal resources, the first set of reference signal resources associated with a first set of reference signal ports having a first precoding configuration applied to a set of antenna ports. In some cases, reference signal manager 1020 may identify that a second reference signal is to be transmitted after receiving an uplink grant and before an associated uplink transmission, the second reference signal associated with a second set of reference signal resources. In some cases, the second set of reference signal resources associated with a second set of reference signal ports having a second precoding configuration applied to the set of antenna ports. In some cases, the first reference signal and the second reference signal are one of an aperiodic, semi-persistent, or periodic SRS.

Resource allocation manager 1025 may receive an uplink grant and an SRI that indicates at least one reference signal port from the first set of reference signal ports (e.g., a first subset) associated with the first set of reference signal resources is to be used for an uplink transmission. In some cases, resource allocation manager 1025 may identify allocated uplink resources from the uplink grant and configure an uplink transmission based on the allocated resources.

Reference signal modification component 1030 may, in some cases, modify the second reference signal based on receiving an uplink grant. In some cases, when the time difference between the transmission of the second reference signal and the uplink transmission is less than or equal to a timing threshold, the second reference signal may be modified to use the precoding configuration of the first set of reference signal resources rather than the second set of reference signal resources. In some cases, when the time difference between the transmission of the second reference signal and the uplink transmission is less than or equal to the timing threshold, the second reference signal may be modified by dropping the transmission of the second reference signal. In some cases, when the time difference between the transmission of the second reference signal and the uplink transmission exceeds the timing threshold, the second reference signal is transmitted using the second set of reference signal resources. That is, in some cases, the second reference signal is a second precoding configuration that is different from the first precoding configuration of the first set of reference signal resources. In some cases, the modifying the second reference signal includes using the precoding configuration of the first set of reference signal resources for the second set of reference signal resources. In some cases, the modifying the second reference signal includes dropping the transmission of the second reference signal.

Resource selection component 1035 may determine, based on a time difference threshold between an uplink grant and a reference signal transmission, whether the subset of reference signal resources to be used for a first uplink transmission is selected from the first set of reference signal resources or the second set of reference signal resources. In some cases, the time difference threshold may be based on an amount of time for receiving and processing the first reference signal. In some cases, the time difference threshold may be based on a processing time for the UE to prepare the uplink transmission. For example, the processing time may correspond to a time for preparing and subsequently transmitting the uplink transmission (e.g., a PUSCH transmission) upon receiving the uplink grant from the base station.

Timing component 1040 may identify a timing threshold associated with the uplink transmission, and determine whether a time difference between transmission of the second reference signal and the uplink transmission exceeds the timing threshold. In some cases, a UE may receive, from a base station, an indication of the time difference threshold. In some cases, the indication of the time difference threshold is received in radio resource RRC signaling prior to the transmitting the first reference signal. In some cases, the indication of the time difference threshold is received in control information included with the uplink grant. In some cases, the time difference threshold is provided in timing information associated with an SRI in the uplink grant.

Figure 11:
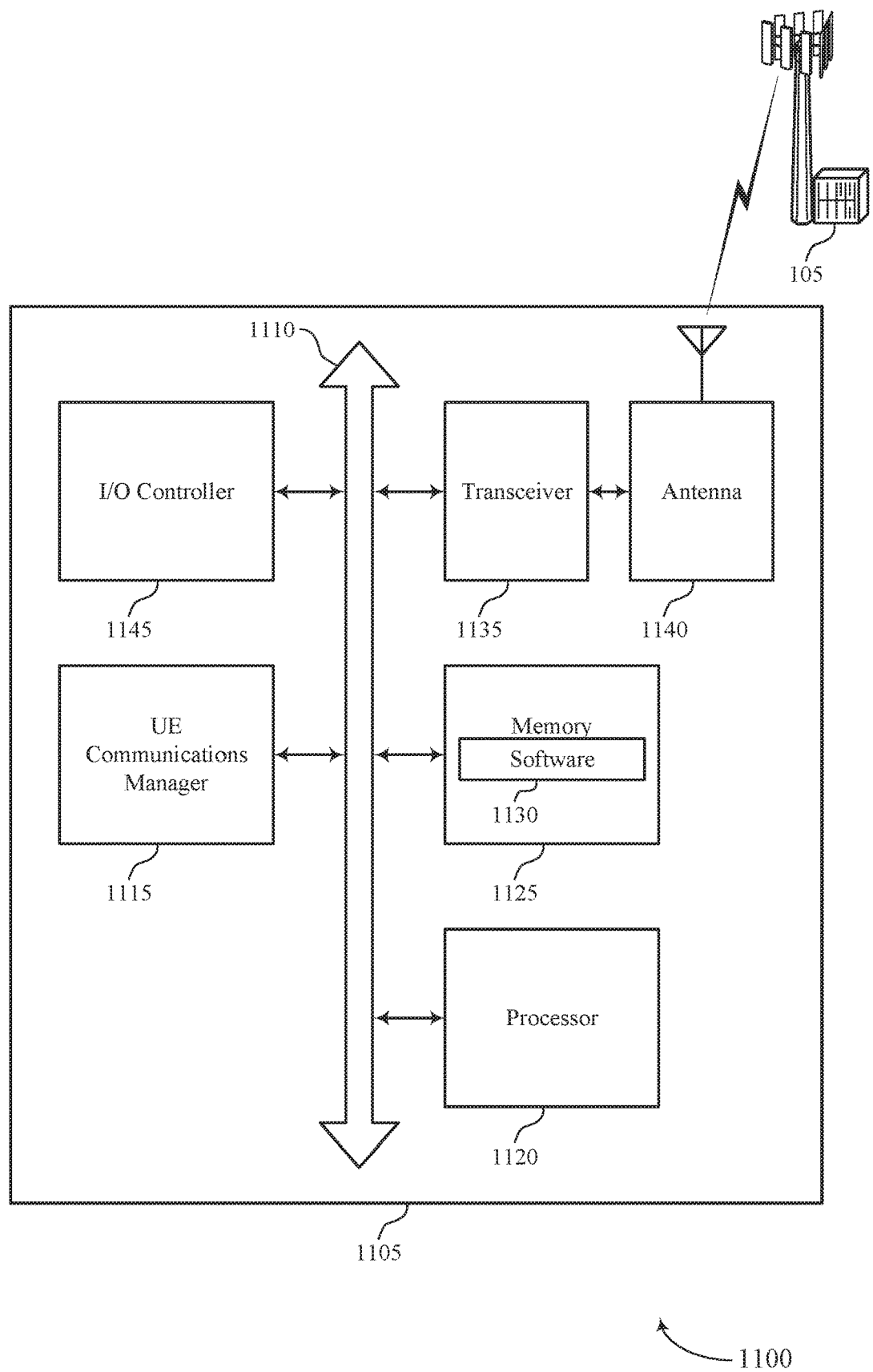
FIG. 11 illustrates a block diagram of a system including a UE that supports reference resource indication techniques in wireless communications in accordance with aspects of the present disclosure.

FIG. 11 shows a diagram of a system 1100 including a device 1105 that supports reference resource indication techniques in wireless communications in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting reference resource indication techniques in wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support reference resource indication techniques in wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
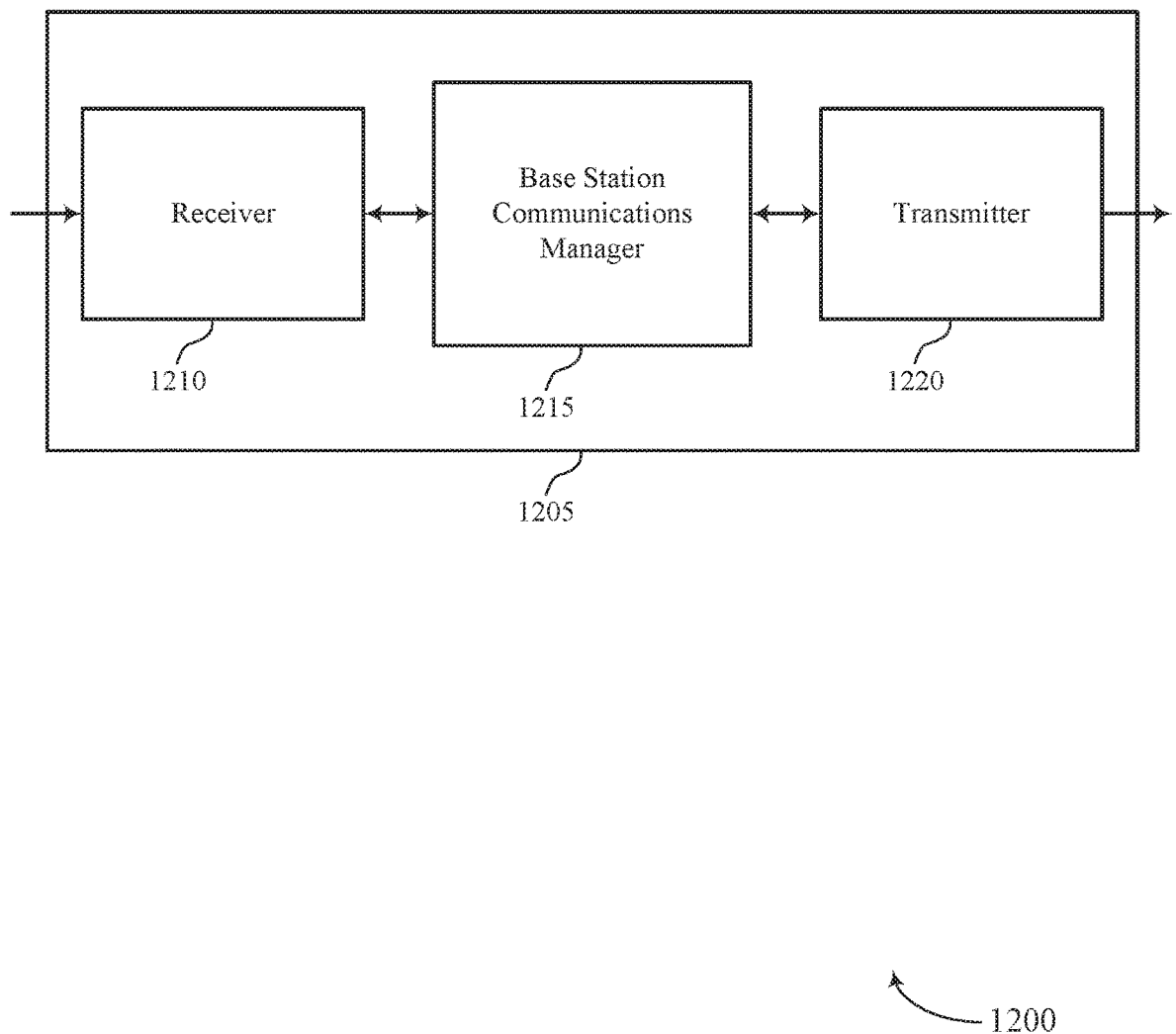
FIGS. 12 through 14 show block diagrams of a device that supports reference resource indication techniques in wireless communications in accordance with aspects of the present disclosure.

FIG. 12 shows a block diagram 1200 of a wireless device 1205 that supports reference resource indication techniques in wireless communications in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to reference resource indication techniques in wireless communications, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may receive, from a UE, a first reference signal that is transmitted using a first set of reference signal resources, the first set of reference signal resources associated with a first set of reference signal ports having a first precoding configuration applied to a set of antenna ports, select at least one reference signal port from the first set of reference signal ports (e.g., a first subset) associated with the first set of reference signal resources to be used by the UE for a first uplink transmission, transmit an uplink grant to the UE that indicates the selected first subset associated with the first set of reference signal resources for the first uplink transmission, identify that a second reference signal is to be transmitted by the UE after the uplink grant and before the first uplink transmission, the second reference signal to be transmitted using a second set of reference signal resources associated with a second set of reference signal ports having a second precoding configuration applied to the set of antenna ports, determine that the first precoding configuration will be used for the second reference signal, and apply or modify one or more parameters for receiving the second reference signal based on the determining. In some examples, the base station communications manager 1215 may select a portion or component of the first reference signal that corresponds to the at least one reference signal port from the first set of reference signal ports. In this manner, the at least one reference signal port can be communicated to the UE for use in transmitting the first uplink transmission. In some examples, the base station communications manager 1215 may identify that that a second reference signal is to be transmitted by the UE base at least in part on a time that the uplink grant was transmitted to the UE.

In some examples, the base station communications manager 1215 may receive the second reference signal in accordance with the second precoding configuration based at least in part on the determining that the time difference between the end of a transmission period of the second reference signal and the start of a transmission period of the first uplink transmission exceeds the timing threshold. In other examples, the base station communications manager 1215 may receive the second reference signal in accordance with the first precoding configuration based at least in part on the determining that the time difference between the end of a transmission period of the second reference signal and the start of a transmission period of the first uplink transmission is less than or equal to the timing threshold. In other examples, the base station communications manager 1215 may refraining from monitoring for a reference signal from the UE until receiving the first uplink transmission based at least in part on the determining that the time difference between the end of a transmission period of the second reference signal and the start of a transmission period of the first uplink transmission is less than or equal to the timing threshold.

The base station communications manager 1215 may also receive, from a UE, a first reference signal that is transmitted using a first set of reference signal resources, the first set of reference signal resources associated with a first set of reference signal ports having a first precoding configuration applied to a set of antenna ports, select at least one reference signal port (e.g., a first subset) associated with the first set of reference signal resources to be used by the UE for a first uplink transmission, determine a timing for transmitting an uplink grant to the UE that indicates the selected at least one reference signal port associated with the first set of reference signal resources for the first uplink transmission, the timing based on a timing threshold, and transmit the uplink grant to the UE according to the determined timing.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
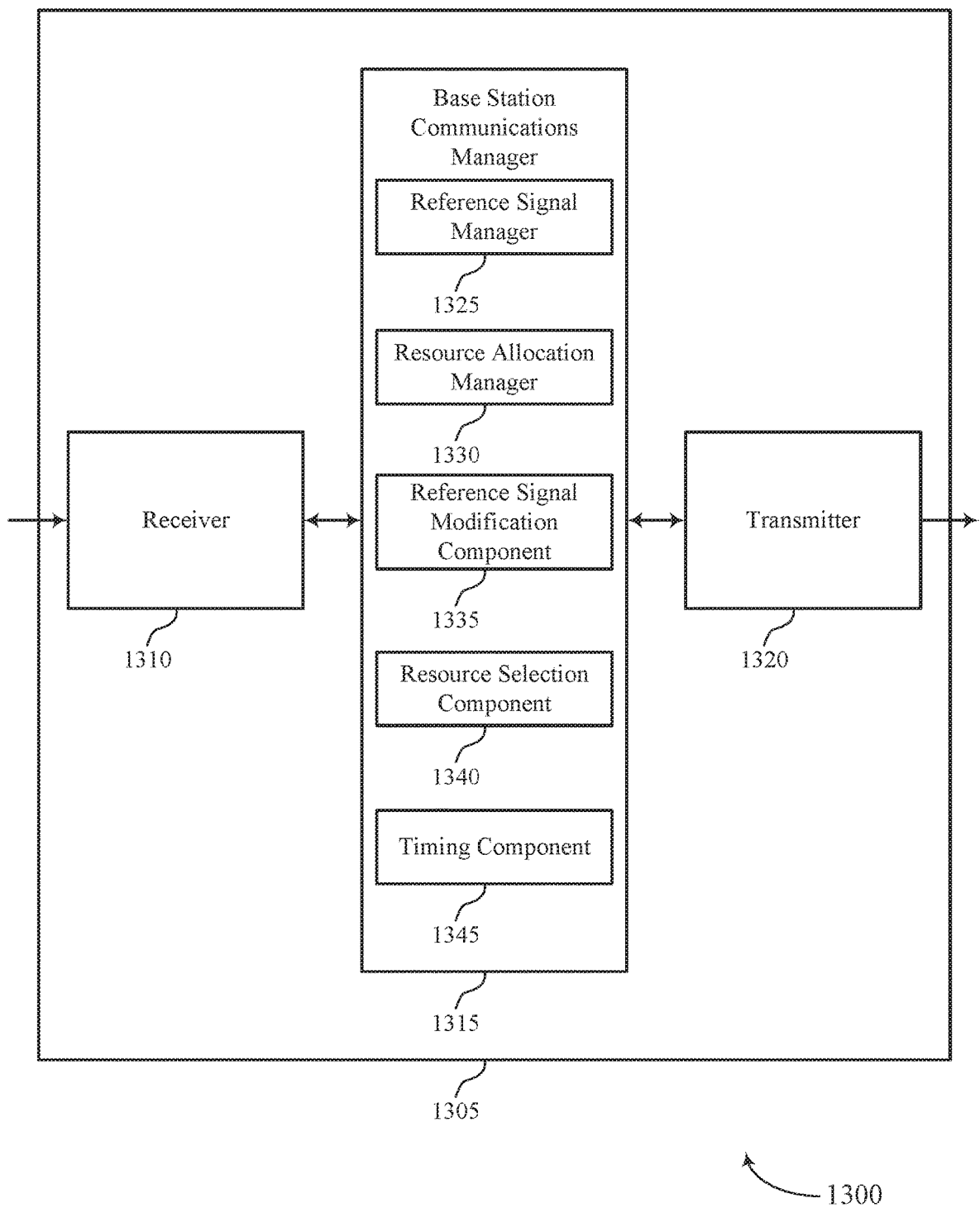

FIG. 13 shows a block diagram 1300 of a wireless device 1305 that supports reference resource indication techniques in wireless communications in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to reference resource indication techniques in wireless communications, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include reference signal manager 1325, resource allocation manager 1330, reference signal modification component 1335, resource selection component 1340, and timing component 1345.

Reference signal manager 1325 may receive, from a UE, a first reference signal that is transmitted using a first set of reference signal resources, the first set of reference signal resources associated with a first set of reference signal ports having a first precoding configuration applied to a set of antenna ports, reference signal manager 1325 may identify that a second reference signal is to be transmitted by the UE after the uplink grant and before a first uplink transmission, the second reference signal to be transmitted using a second set of reference signal resources associated with a second set of reference signal ports having a second precoding configuration applied to the set of antenna ports. In some cases, the first reference signal and the second reference signal are one of an aperiodic, semi-persistent, or periodic SRS.

Resource allocation manager 1330 may select at least one reference signal port from the first set of reference signal ports (e.g., a first subset) associated with the first set of reference signal resources to be used by the UE for a first uplink transmission, transmit an uplink grant to the UE that indicates the selected first subset associated with the first set of reference signal resources for the first uplink transmission, and transmit the uplink grant to the UE according to the determined timing.

Reference signal modification component 1335 may apply or modify one or more parameters associated with the second reference signal. In some cases, when the time difference between the transmission of the second reference signal and the first uplink transmission is less than or equal to the timing threshold, the second reference signal is modified such that the first precoding configuration will be used for the second reference signal. In some cases, when the time difference between the transmission of the second reference signal and the first uplink transmission is less than or equal to the timing threshold, the second reference signal is modified such that the transmission of the second reference signal will be dropped. In some cases, when the time difference between the transmission of the second reference signal and the first uplink transmission exceeds the timing threshold, the second reference signal is transmitted using the second precoding configuration. In some cases, the modifying the one or more parameters associated with the second reference signal includes determining that the first precoding configuration will be used for the second reference signal. In some cases, the modifying the one or more parameters associated with the second reference signal includes determining that a transmission of the second reference signal will be dropped.

Resource selection component 1340 may select at least one reference signal port from the first set of reference signal ports. For example, resource selection component 1340 may select a portion of the first reference signal that corresponds to at least one reference signal port from the first set of reference signal ports. The at least one reference signal port may include all reference signal port of the first set of reference signal ports or a first subset of the first set of reference signal ports to be used by the UE for a first uplink transmission.

Timing component 1345 may identify a timing threshold associated with the first uplink transmission, determine whether a time difference between a transmission of the second reference signal and the first uplink transmission exceeds the timing threshold, and modify the one or more parameters associated with the second reference signal based on the determining. In some cases, timing component 1345 may determine a timing for transmitting an uplink grant to the UE that indicates the selected at least one reference signal port (e.g., the first subset) associated with the first set of reference signal resources for the first uplink transmission, the timing based on a timing threshold, and transmit, to the UE, an indication of the timing threshold. In some cases, the timing for transmitting the uplink grant is less than a time duration of the timing threshold (e.g., occurring no earlier than the timing threshold). In some cases, the timing for transmitting the uplink grant is no later than the timing threshold plus a time duration between a first transmission time of the first reference signal and a second transmission time of a second reference signal from the UE. In some cases, the timing threshold is determined based on a processing time associated with the first reference signal and a preparation time of transmitting the uplink grant. In some case, the timing threshold may be based on a processing time for the UE to prepare the uplink transmission. For example, the UE may need to switch precoding configurations and reference signal ports and may not have sufficient time to switch back and forth the between switch precoding configurations and reference signal ports that may be needed for each of the second reference signal and the uplink transmission. In some cases, the indication of the timing threshold is transmitted in RRC signaling prior to the first reference signal. In some cases, the indication of the timing threshold is transmitted in control information included with the uplink grant. In some cases, the timing threshold is a timing information associated with an SRI.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
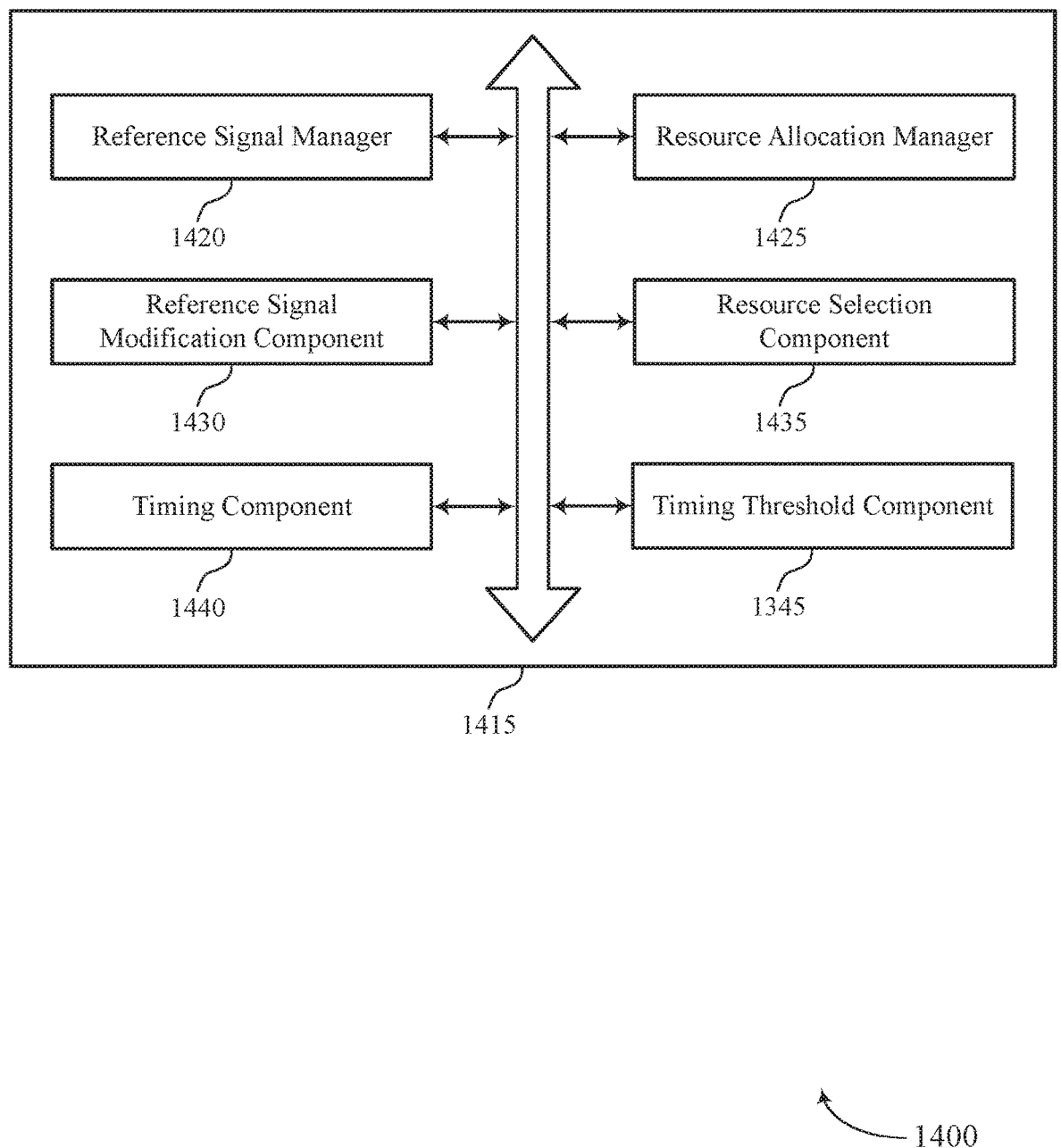

FIG. 14 shows a block diagram 1400 of a base station communications manager 1415 that supports reference resource indication techniques in wireless communications in accordance with aspects of the present disclosure. The base station communications manager 1415 may be an example of aspects of a base station communications manager 1515 described with reference to FIGS. 12, 13, and 15. The base station communications manager 1415 may include reference signal manager 1420, resource allocation manager 1425, reference signal modification component 1430, resource selection component 1435, and timing component 1440. Each of these modules may communicate, directly or indirectly, with one another (e.g., via one or more buses).

Reference signal manager 1420 may receive, from a UE, a first reference signal that is transmitted using a first set of reference signal resources, the first set of reference signal resources associated with a first set of reference signal ports having a first precoding configuration applied to a set of antenna ports. In some cases, reference signal manager 1420 may identify that a second reference signal is to be transmitted by the UE after the uplink grant and before a first uplink transmission, the second reference signal to be transmitted using a second set of reference signal resources associated with a second set of reference signal ports having a second precoding configuration applied to the set of antenna ports. In some cases, the first reference signal and the second reference signal are one of an aperiodic, semi-persistent, or periodic SRS.

Resource allocation manager 1425 may at least one reference signal port from the first set of reference signal ports (e.g., a first subset) to be used by the UE for a first uplink transmission, transmit an uplink grant to the UE that indicates the selected first subset associated with the first set of reference signal resources for the first uplink transmission, and transmit the uplink grant to the UE according to the determined timing.

Reference signal modification component 1430 may apply or modify one or more parameters associated with the second reference signal. In some cases, when the time difference between the transmission of the second reference signal and the first uplink transmission is less than or equal to the timing threshold, the second reference signal is modified such that the first precoding configuration will be used for the second reference signal. In some cases, when the time difference between the transmission of the second reference signal and the first uplink transmission is less than or equal to the timing threshold, the second reference signal is modified such that the transmission of the second reference signal will be dropped. For example, reference signal modification component 1430 may determine that a transmission of the second reference signal will be dropped based at least in part on the transmitting the uplink grant (e.g., a time when the uplink grant is transmitted as compared to when the first reference signal is received). In some cases, when the time difference between the transmission of the second reference signal and the first uplink transmission exceeds the timing threshold, the second reference signal is transmitted using the second precoding configuration. In some cases, the modifying the one or more parameters associated with the second reference signal includes determining that the first precoding configuration will be used for the second reference signal. In some cases, the modifying the one or more parameters associated with the second reference signal includes determining that a transmission of the second reference signal will be dropped.

Resource selection component 1435 may select at least one reference signal port from the first set of reference signal ports (e.g., a first subset) to be used by the UE for a first uplink transmission. For example, the at least one reference signal port from the first set of reference signal ports may be associated with the first set of reference signal resources on which the first reference signal was transmitted.

Timing component 1440 may identify a timing threshold associated with the first uplink transmission, determine whether a time difference between a transmission of the second reference signal and the first uplink transmission exceeds the timing threshold, and modify the one or more parameters associated with the second reference signal based on the determining. In some cases, timing component 1440 may determine a timing for transmitting an uplink grant to the UE that indicates the selected at least one reference signal port (e.g., the first subset) associated with the first set of reference signal resources for the first uplink transmission, the timing based on a timing threshold, and transmit, to the UE, an indication of the timing threshold. In some cases, a modification of the second reference signal is based at least in part on the transmitted timing threshold. In some cases, the timing for transmitting the uplink grant is less than a time duration of the timing threshold (e.g., occurring no earlier than the timing threshold). In some cases, the timing for transmitting the uplink grant is no later than the timing threshold plus a time duration between a first transmission time of the first reference signal and a second transmission time of a second reference signal from the UE.

Timing threshold component 1345 may, in some cases, determine the timing threshold. In some cases, the timing threshold is determined based on a processing time associated with the first reference signal and a preparation time of transmitting the uplink grant. In some cases, the indication of the timing threshold is transmitted in RRC signaling prior to the first reference signal. In some cases, the indication of the timing threshold is transmitted in control information included with the uplink grant. In some cases, the timing threshold is a timing information associated with an SRI.

Figure 15:
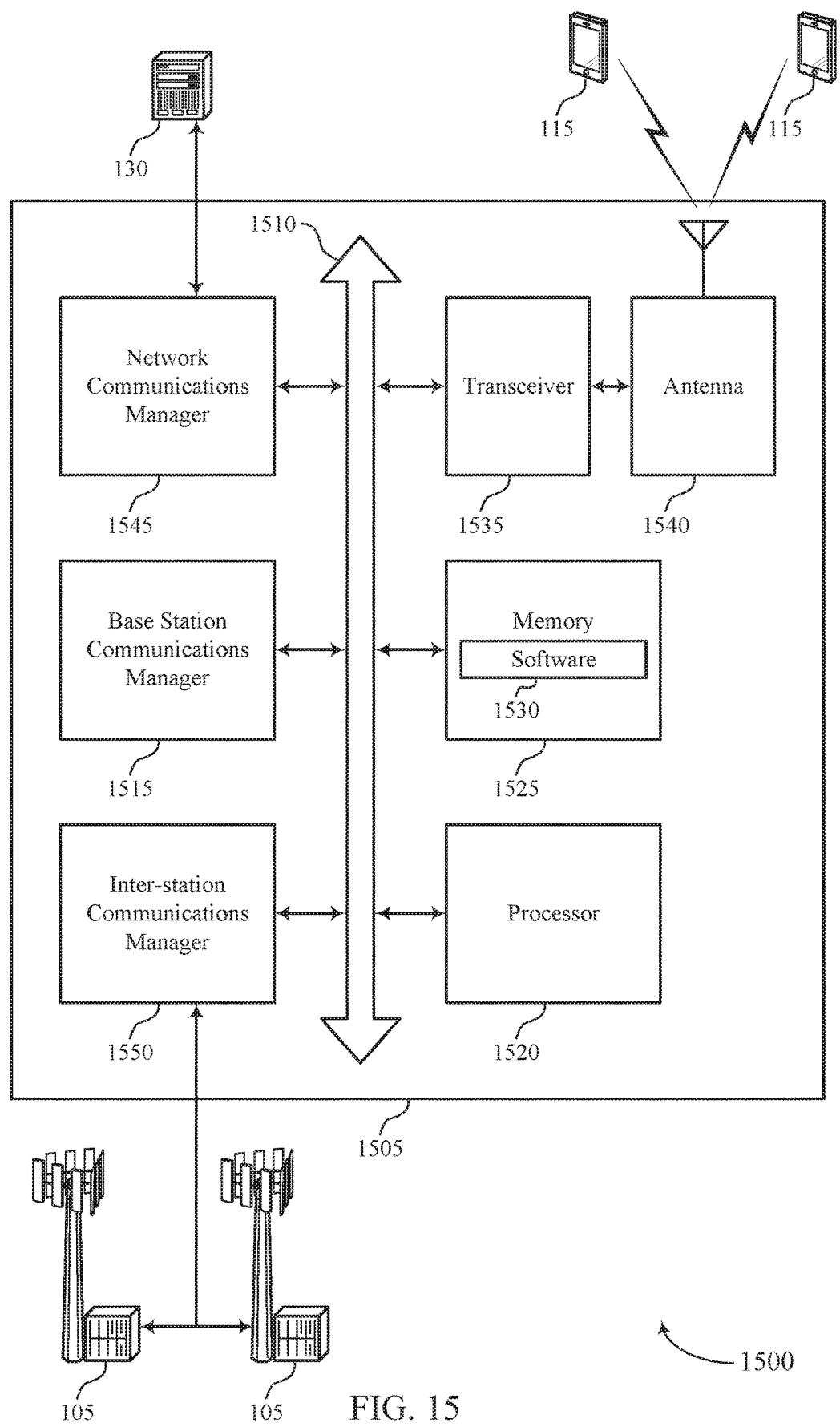
FIG. 15 illustrates a block diagram of a system including a base station that supports reference resource indication techniques in wireless communications in accordance with aspects of the present disclosure.

FIG. 15 shows a diagram of a system 1500 including a device 1505 that supports reference resource indication techniques in wireless communications in accordance with aspects of the present disclosure. Device 1505 may be an example of or include the components of base station 105 as described herein, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting reference resource indication techniques in wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support reference resource indication techniques in wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described herein. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
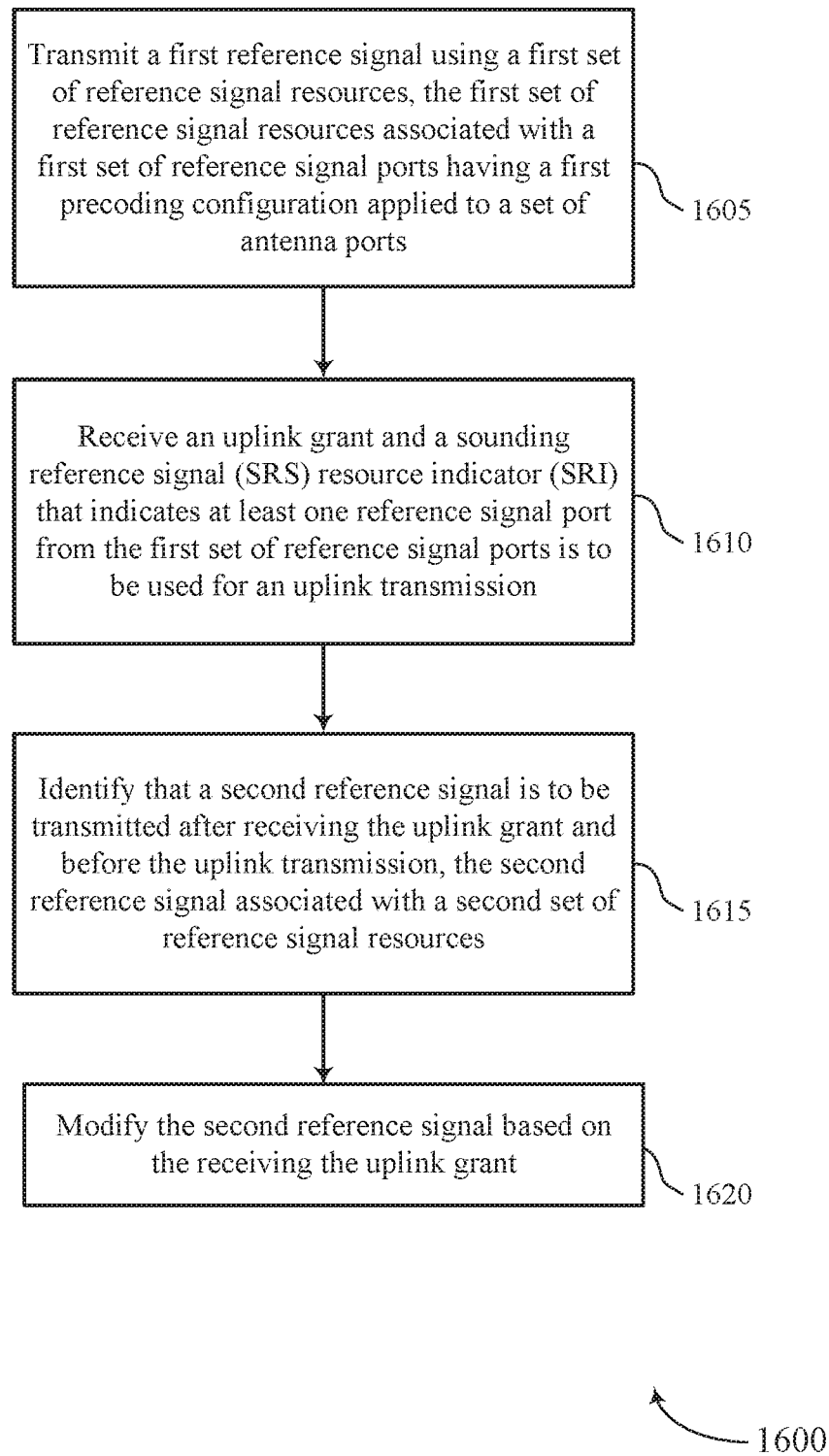
FIGS. 16 through 22 illustrate methods for reference resource indication techniques in wireless communications in accordance with aspects of the present disclosure.

FIG. 16 shows a flowchart illustrating a method 1600 for reference resource indication techniques in wireless communications in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may transmit a first reference signal using a first set of reference signal resources, the first set of reference signal resources associated with a first set of reference signal ports having a first precoding configuration applied to a set of antenna ports. The operations of 1605 may be performed according to the methods described herein. In certain examples, aspects of the operations of 1605 may be performed by a reference signal manager as described with reference to FIGS. 8 through 11.

At 1610 the UE 115 may receive an uplink grant and an SRI that indicates at least one reference signal port from the first set of reference signal ports (e.g., a first subset) associated with the first set of reference signal resources is to be used for an uplink transmission. For example, the at least one reference signal port may be indicated by indicating a first subset of the first set of reference signal resources. The operations of 1610 may be performed according to the methods described herein. In certain examples, aspects of the operations of 1610 may be performed by a resource allocation manager as described with reference to FIGS. 8 through 11.

At 1615 the UE 115 may identify that a second reference signal is to be transmitted after receiving the uplink grant and before the uplink transmission, the second reference signal associated with a second set of reference signal resources. The operations of 1615 may be performed according to the methods described herein. In certain examples, aspects of the operations of 1615 may be performed by a reference signal manager as described with reference to FIGS. 8 through 11.

At 1620 the UE 115 may modify the second reference signal based at least in part on the receiving the uplink grant. The operations of 1620 may be performed according to the methods described herein. In certain examples, aspects of the operations of 1620 may be performed by a reference signal modification component as described with reference to FIGS. 8 through 11.

Figure 17:
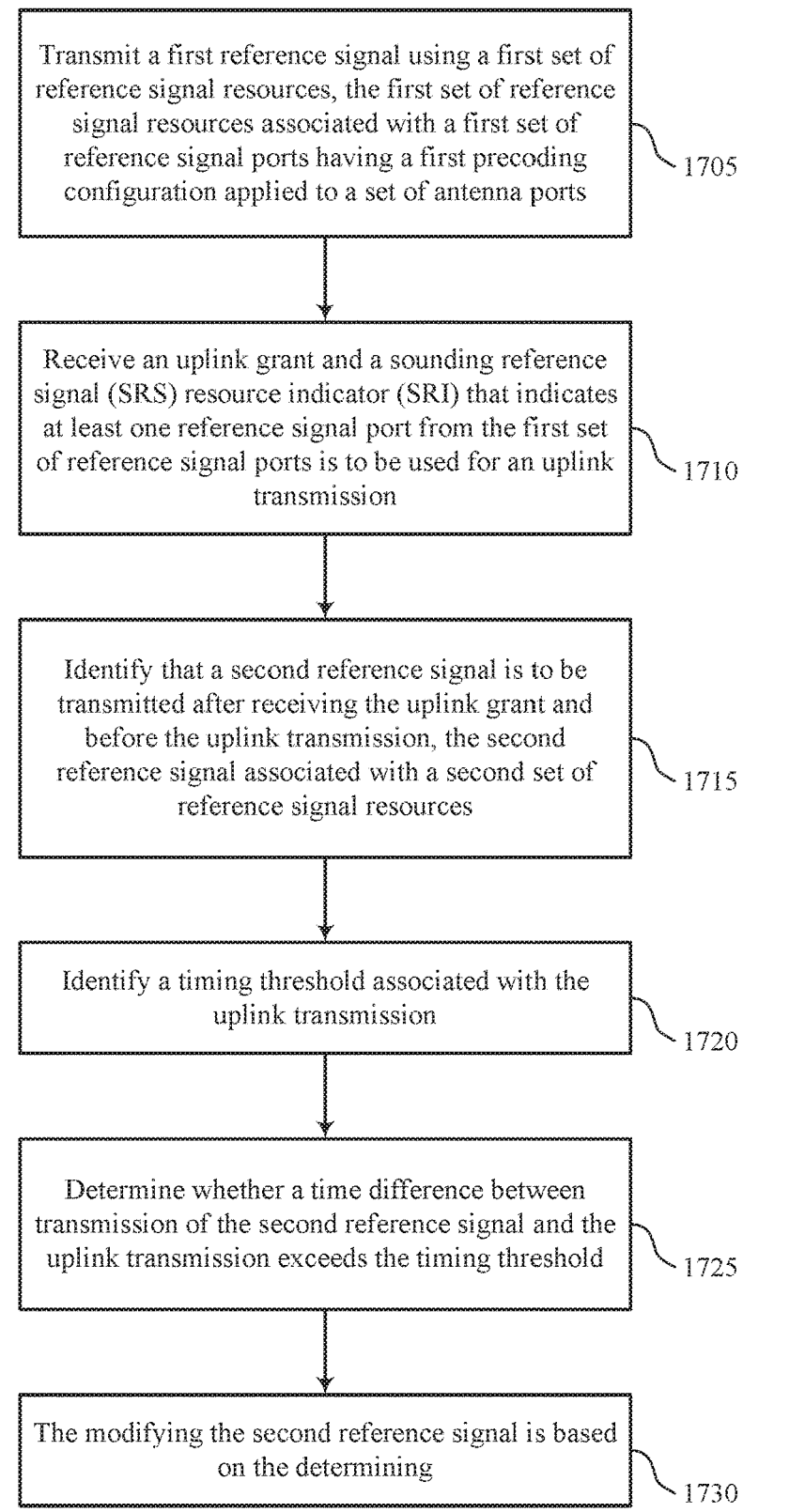

FIG. 17 shows a flowchart illustrating a method 1700 for reference resource indication techniques in wireless communications in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may transmit a first reference signal using a first set of reference signal resources, the first set of reference signal resources associated with a first set of reference signal ports having a first precoding configuration applied to a set of antenna ports. The operations of 1705 may be performed according to the methods described herein. In certain examples, aspects of the operations of 1705 may be performed by a reference signal manager as described with reference to FIGS. 8 through 11.

At 1710 the UE 115 may receive an uplink grant and an SRI that indicates at least one reference signal port from the first set of reference signal ports (e.g., a first subset) associated with the first set of reference signal resources is to be used for an uplink transmission. For example, the at least one reference signal port may be indicated by indicating a first subset of the first set of reference signal resources. The operations of 1710 may be performed according to the methods described herein. In certain examples, aspects of the operations of 1710 may be performed by a resource allocation manager as described with reference to FIGS. 8 through 11.

At 1715 the UE 115 may identify that a second reference signal is to be transmitted after receiving the uplink grant and before the uplink transmission, the second reference signal associated with a second set of reference signal resources. The operations of 1715 may be performed according to the methods described herein. In certain examples, aspects of the operations of 1715 may be performed by a reference signal manager as described with reference to FIGS. 8 through 11.

At 1720 the UE 115 may identify a timing threshold associated with the uplink transmission. The operations of 1720 may be performed according to the methods described herein. In certain examples, aspects of the operations of 1720 may be performed by a timing component as described with reference to FIGS. 8 through 11.

At 1725 the UE 115 may determine whether a time difference between transmission of the second reference signal and the uplink transmission exceeds the timing threshold. The operations of 1725 may be performed according to the methods described herein. In certain examples, aspects of the operations of 1725 may be performed by a timing component as described with reference to FIGS. 8 through 11.

At 1730 the UE 115 may modify the second reference signal based at least in part on the determining. The operations of 1730 may be performed according to the methods described herein. In certain examples, aspects of the operations of 1730 may be performed by a timing component as described with reference to FIGS. 8 through 11. In some cases, when the time difference between the transmission of the second reference signal and the uplink transmission is less than or equal to the timing threshold, the modifying the second reference signal comprises using the precoding configuration of the first set of reference signal resources for the second reference signal of the second set of reference signal resources. For example, the precoding configuration for the second reference signal of the second set of reference signal resources may correspond to the reference signal port of the first set of reference signal ports indicated by the SRI. In some cases, when the time difference between the transmission of the second reference signal and the uplink transmission is less than or equal to the timing threshold, the modifying the second reference signal comprises dropping the transmission of the second reference signal. In some cases, when the time difference between the transmission of the second reference signal and the uplink transmission exceeds the timing threshold, the second reference signal is transmitted using the second set of reference signal resources. That is, in some cases, the second reference signal is transmitted using a second precoding configuration that is different from the first precoding configuration of the first set of reference signal resources.

Figure 18:
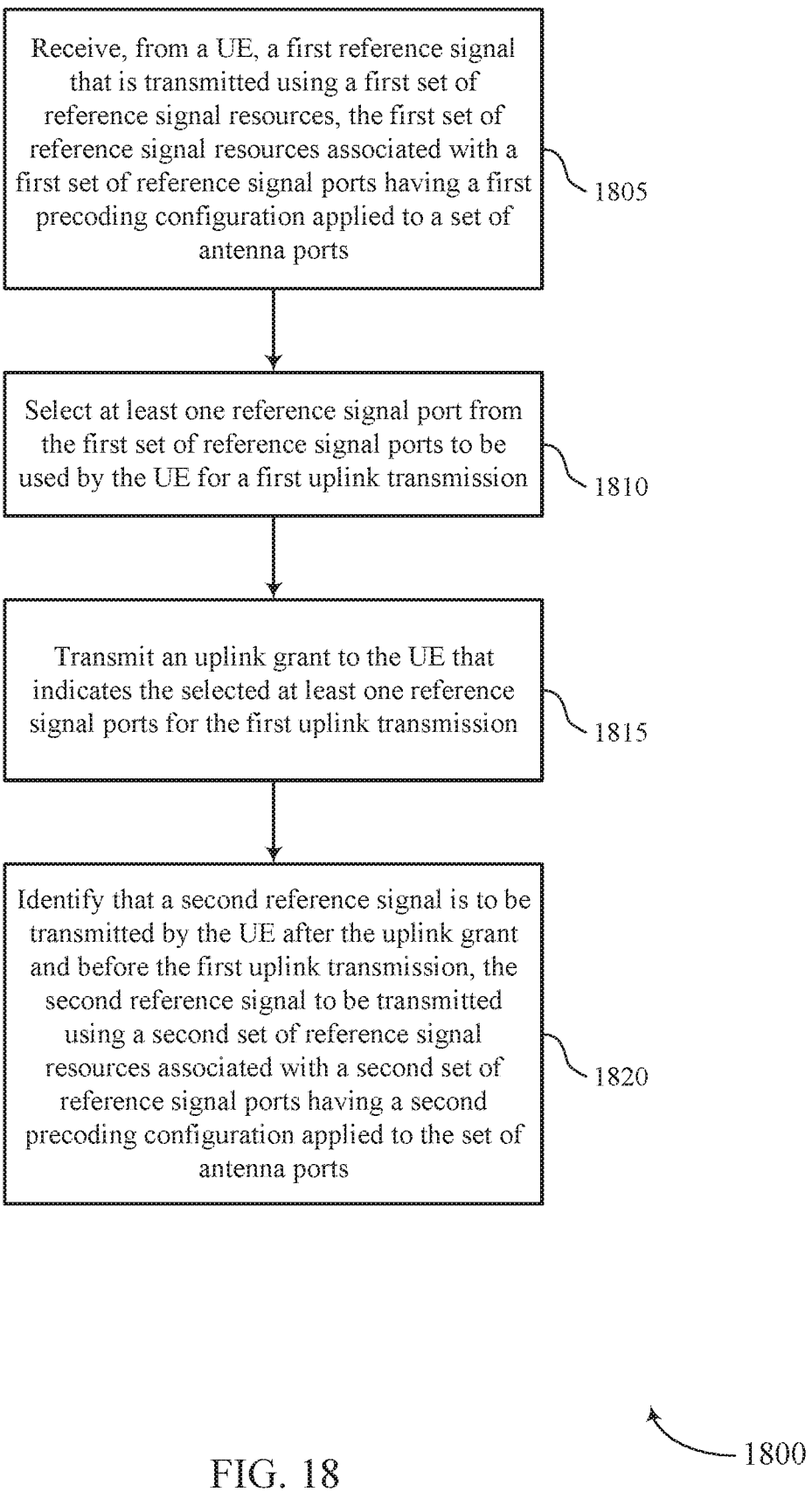

FIG. 18 shows a flowchart illustrating a method 1800 for reference resource indication techniques in wireless communications in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive, from a user equipment (UE), a first reference signal that is transmitted using a first set of reference signal resources, the first set of reference signal resources associated with a first set of reference signal ports having a first precoding configuration applied to a set of antenna ports. The operations of 1805 may be performed according to the methods described herein. In certain examples, aspects of the operations of 1805 may be performed by a reference signal manager as described with reference to FIGS. 12 through 15.

At 1810 the base station 105 may select at least one reference signal port from the first set of reference signal ports (e.g., a first subset) associated with the first set of reference signal resources to be used by the UE for a first uplink transmission. For example, the at least one reference signal port may be selected by selecting a first subset of the first set of reference signal resources. The operations of 1810 may be performed according to the methods described herein. In certain examples, aspects of the operations of 1810 may be performed by a resource allocation manager as described with reference to FIGS. 12 through 15.

At 1815 the base station 105 may transmit an uplink grant to the UE that indicates the selected first subset associated with the first set of reference signal resources for the first uplink transmission. The operations of 1815 may be performed according to the methods described herein. In certain examples, aspects of the operations of 1815 may be performed by a resource allocation manager as described with reference to FIGS. 12 through 15.

At 1820 the base station 105 may identify that a second reference signal is to be transmitted by the UE after the uplink grant and before the first uplink transmission, the second reference signal to be transmitted using a second set of reference signal resources associated with a second set of reference signal ports having a second precoding configuration applied to the set of antenna ports. In some examples, the base station 105 may identify that a second reference signal is to be transmitted by the UE base at least in part on a time when the uplink grant was transmitted to the UE. The operations of 1820 may be performed according to the methods described herein. In certain examples, aspects of the operations of 1820 may be performed by a reference signal manager as described with reference to FIGS. 12 through 15.

In some options, the base station 105 may determine that the first precoding configuration will be used for the second reference signal. The base station 105 may apply or modify one or more parameters associated with the second reference signal based at least in part on the determining the first precoding configuration will be used for the second reference signal. In some options, the base station 105 may determine that a transmission of the second reference signal will be dropped. The base station 105 may refrain from monitoring the second reference signal based at least in part on the determining that the transmission of the second reference signal will be dropped. In certain examples, aspects of these operations may be performed by a resource allocation manager as described with reference to FIGS. 12 through 15.

In some options, the base station 105 may, when the time difference between the transmission of the second reference signal and the first uplink transmission is less than or equal to the timing threshold, modify the one or more parameters associated with the second reference signal. The base station 105 may determine that the first precoding configuration will be used for the second reference signal. In some cases, the base station 105 may, when the time difference between the transmission of the second reference signal and the first uplink transmission is less than or equal to the timing threshold, determine that the transmission of the second reference signal will be dropped. In some options, base station 105 may determine that a transmission of the second reference signal will be dropped based at least in part on the transmitting the uplink grant (e.g., a time when the uplink grant is transmitted as compared to when the first reference signal is received). In some cases, when the time difference between the transmission of the second reference signal and the first uplink transmission exceeds the timing threshold, the second reference signal is transmitted using the second precoding configuration. In certain examples, aspects of these operations may be performed by a resource allocation manager as described with reference to FIGS. 12 through 15.

Figure 19:
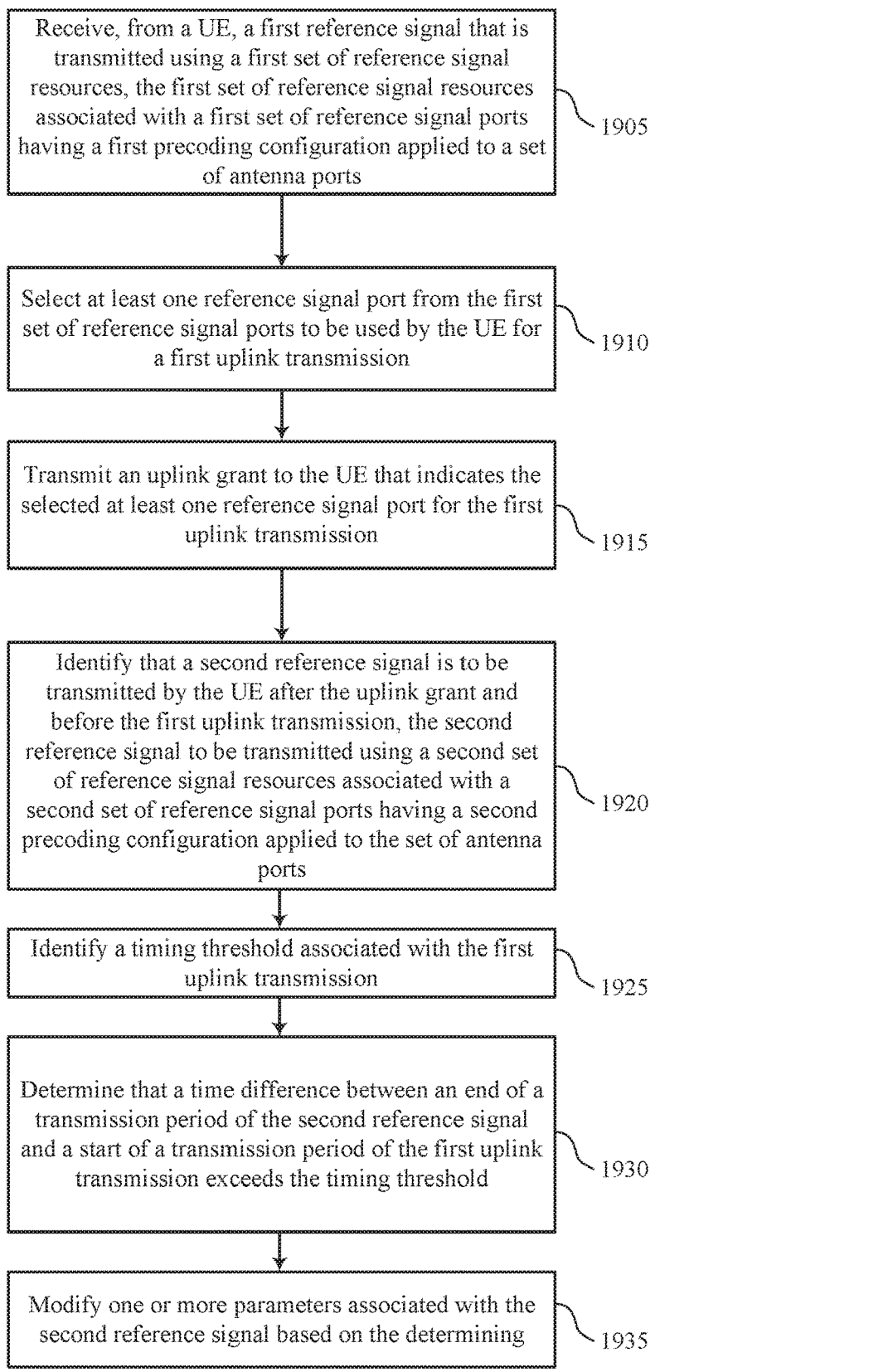

FIG. 19 shows a flowchart illustrating a method 1900 for reference resource indication techniques in wireless communications in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may receive, from a user equipment (UE), a first reference signal that is transmitted using a first set of reference signal resources, the first set of reference signal resources associated with a first set of reference signal ports having a first precoding configuration applied to a set of antenna ports. The operations of 1905 may be performed according to the methods described herein. In certain examples, aspects of the operations of 1905 may be performed by a reference signal manager as described with reference to FIGS. 12 through 15.

At 1910 the base station 105 may select at least one reference signal port from the first set of reference signal ports (e.g., a first subset) associated with the first set of reference signal resources to be used by the UE for a first uplink transmission. For example, the at least one reference signal port may be selected by selecting a first subset of the first set of reference signal resources. The operations of 1910 may be performed according to the methods described herein. In certain examples, aspects of the operations of 1910 may be performed by a resource allocation manager as described with reference to FIGS. 12 through 15.

At 1915 the base station 105 may transmit an uplink grant to the UE that indicates the selected first subset associated with the first set of reference signal resources for the first uplink transmission. The operations of 1915 may be performed according to the methods described herein. In certain examples, aspects of the operations of 1915 may be performed by a resource allocation manager as described with reference to FIGS. 12 through 15.

At 1920 the base station 105 may identify that a second reference signal is to be transmitted by the UE after the uplink grant and before the first uplink transmission, the second reference signal to be transmitted using a second set of reference signal resources associated with a second set of reference signal ports having a second precoding configuration applied to the set of antenna ports. The operations of 1920 may be performed according to the methods described herein. In certain examples, aspects of the operations of 1920 may be performed by a reference signal manager as described with reference to FIGS. 12 through 15.

At 1925 the base station 105 may identify a timing threshold associated with the first uplink transmission. The operations of 1925 may be performed according to the methods described herein. In certain examples, aspects of the operations of 1925 may be performed by a timing component as described with reference to FIGS. 12 through 15.

At 1930 the base station 105 may determine whether a time difference between an end of a transmission period of the second reference signal and the first uplink transmission exceeds the timing threshold. The operations of 1930 may be performed according to the methods described herein. In certain examples, aspects of the operations of 1930 may be performed by a timing component as described with reference to FIGS. 12 through 15.

At 1935 the base station 105 may modify the one or more parameters associated with the second reference signal based at least in part on the determining. The operations of 1935 may be performed according to the methods described herein. In certain examples, aspects of the operations of 1935 may be performed by a timing component as described with reference to FIGS. 12 through 15.

Figure 20:
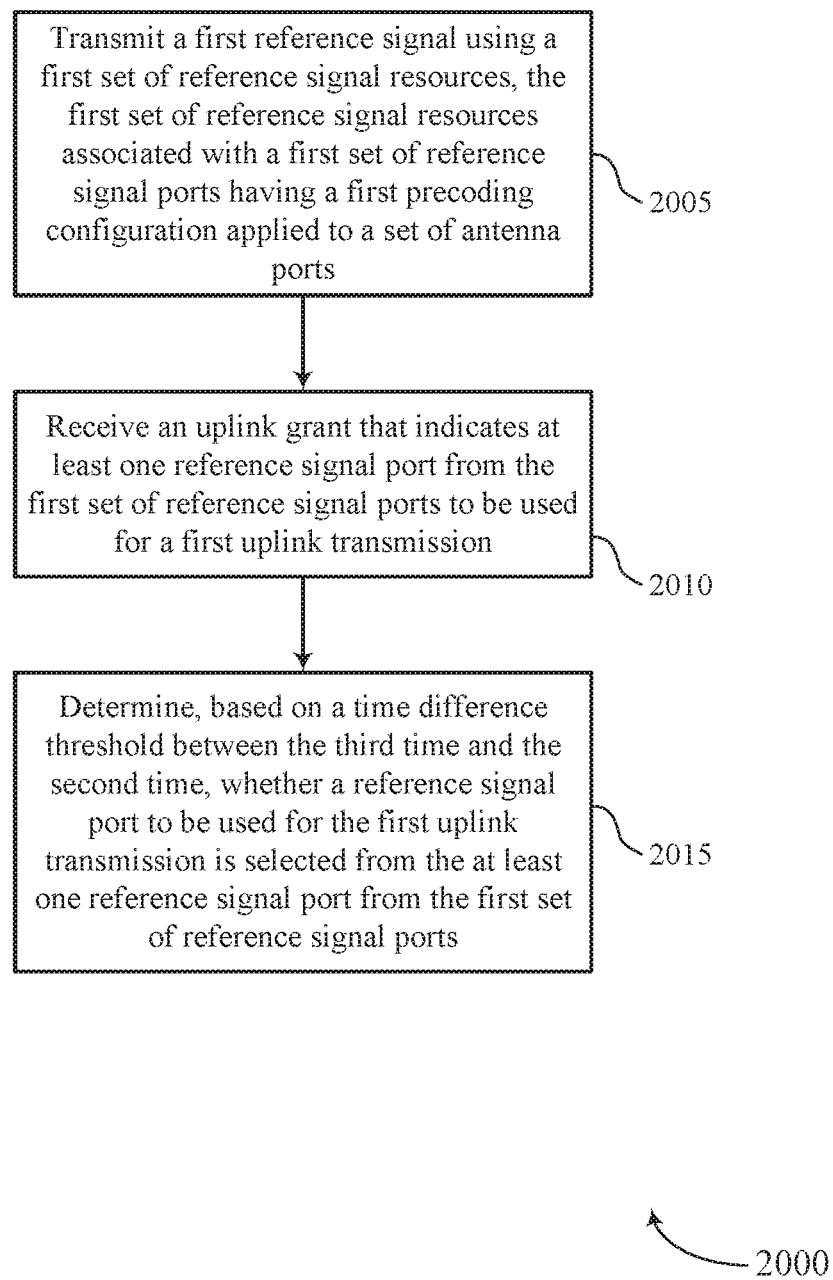

FIG. 20 shows a flowchart illustrating a method 2000 for reference resource indication techniques in wireless communications in accordance with aspects of the present disclosure. The operations of method 2000 may be implemented by a UE 115 or its components as described herein. For example, the operations of method 2000 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may transmit a first reference signal using a first set of reference signal resources, the first set of reference signal resources associated with a first set of reference signal ports having a first precoding configuration applied to a set of antenna ports. The operations of 2005 may be performed according to the methods described herein. In certain examples, aspects of the operations of 2005 may be performed by a reference signal manager as described with reference to FIGS. 8 through 11.

At 2010 the UE 115 may receive an uplink grant that indicates at least one reference signal port from the first set of reference signal ports to be used for a first uplink transmission. The operations of 2010 may be performed according to the methods described herein. In certain examples, aspects of the operations of 2010 may be performed by a resource allocation manager as described with reference to FIGS. 8 through 11.

At 2015 the UE 115 may determine, based at least in part on a time difference threshold associated with the timing of receiving the uplink grant, whether a reference signal port to be used for the first uplink transmission is selected from the at least one reference signal port from the first set of reference signal ports. The operations of 2015 may be performed according to the methods described herein. In certain examples, aspects of the operations of 2015 may be performed by a resource selection component as described with reference to FIGS. 8 through 11.

Figure 21:
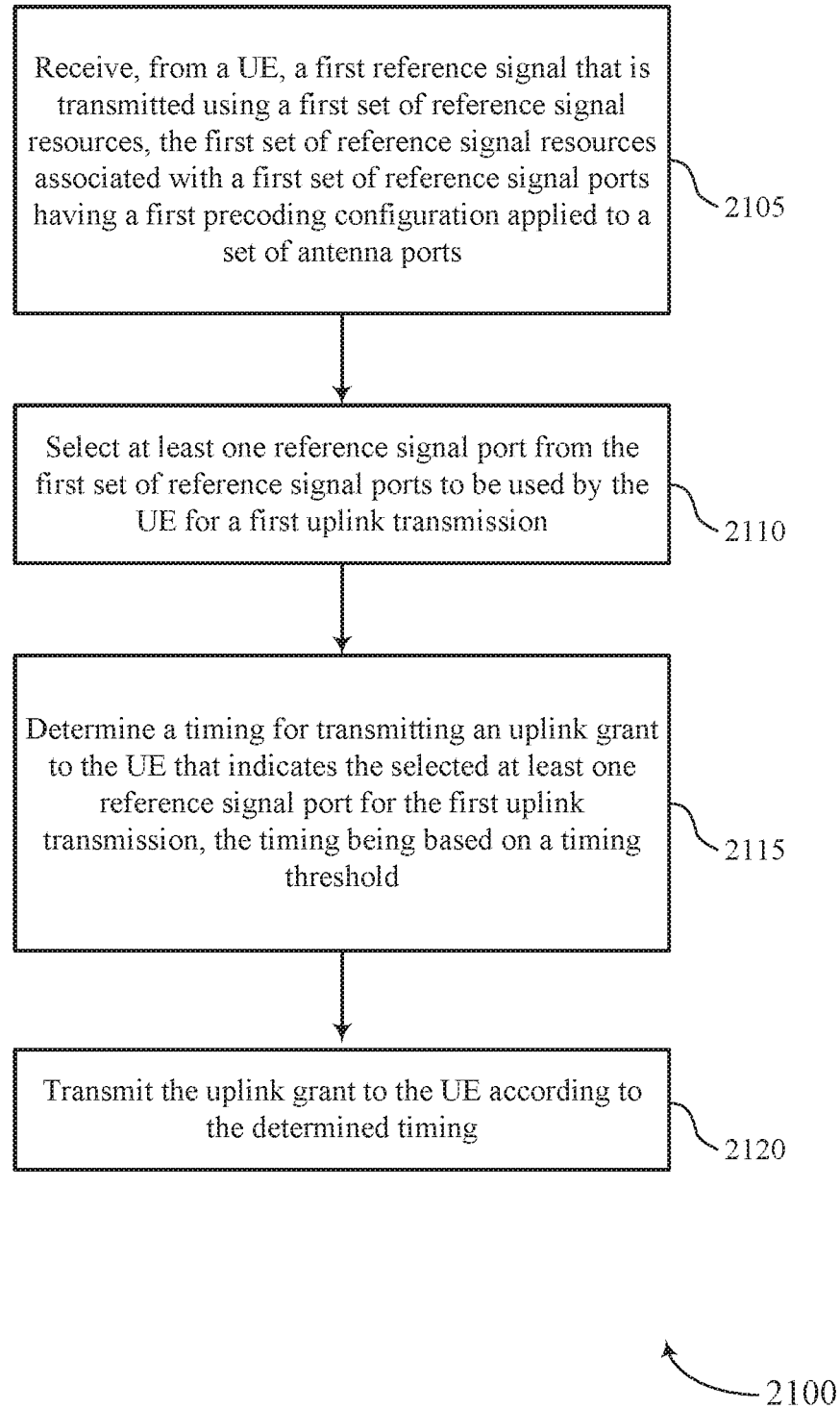

FIG. 21 shows a flowchart illustrating a method 2100 for reference resource indication techniques in wireless communications in accordance with aspects of the present disclosure. The operations of method 2100 may be implemented by a base station 105 or its components as described herein. For example, the operations of method 2100 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may receive, from a user equipment (UE), a first reference signal that is transmitted using a first set of reference signal resources, the first set of reference signal resources associated with a first set of reference signal ports having a first precoding configuration applied to a set of antenna ports. The operations of 2105 may be performed according to the methods described herein. In certain examples, aspects of the operations of 2105 may be performed by a reference signal manager as described with reference to FIGS. 12 through 15.

At 2110 the base station 105 may select at least one reference signal port from the first set of reference signal ports (e.g., a first subset) associated with the first set of reference signal resources to be used by the UE for a first uplink transmission. For example, the at least one reference signal port may be selected by selecting a first subset of the first set of reference signal resources. In some examples, the base station 105 may select a portion or component of the received first reference signal that corresponds to the at least one reference signal port from the first set of reference signal ports. The operations of 2110 may be performed according to the methods described herein. In certain examples, aspects of the operations of 2110 may be performed by a resource selection component as described with reference to FIGS. 12 through 15.

At 2115 the base station 105 may determine a timing for transmitting an uplink grant to the UE that indicates the selected at least one reference signal port (e.g., the first subset) associated with the first set of reference signal resources for the first uplink transmission, the timing based at least in part on a timing threshold. The operations of 2115 may be performed according to the methods described herein. In certain examples, aspects of the operations of 2115 may be performed by a timing component as described with reference to FIGS. 12 through 15. In some cases, the timing for transmitting the uplink grant is less than a time duration of the timing threshold (e.g., occurring no earlier than the timing threshold). In some cases, the timing for transmitting the uplink grant is no later than the timing threshold plus a time duration between a first transmission time of the first reference signal and a second transmission time of a second reference signal from the UE. In some cases, the timing threshold is determined based at least in part on a processing time associated with receiving the first reference signal and a preparation time of transmitting the uplink grant.

At 2120 the base station 105 may transmit the uplink grant to the UE according to the determined timing. The operations of 2120 may be performed according to the methods described herein. In certain examples, aspects of the operations of 2120 may be performed by a resource allocation manager as described with reference to FIGS. 12 through 15.

Figure 22:
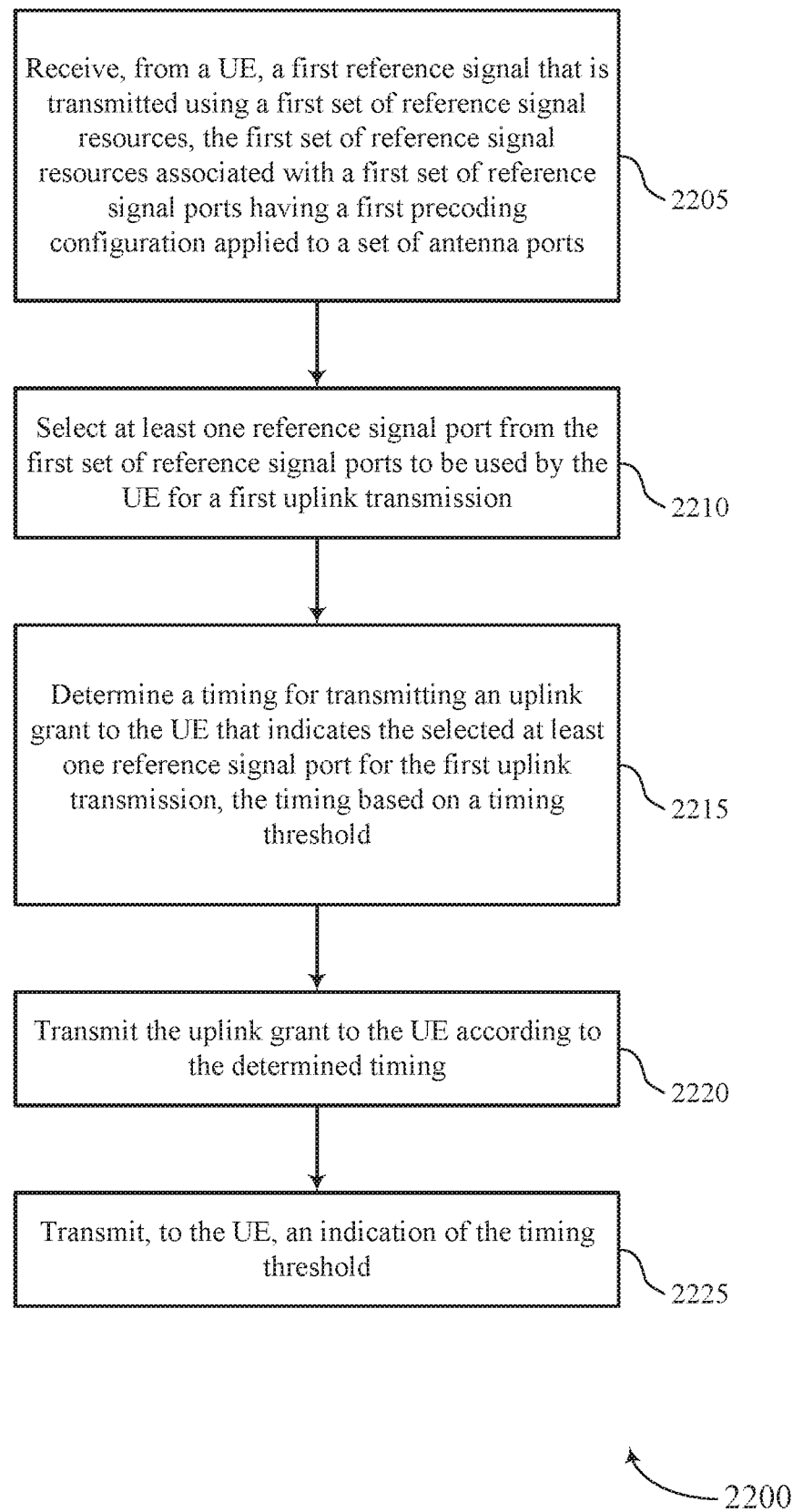

FIG. 22 shows a flowchart illustrating a method 2200 for reference resource indication techniques in wireless communications in accordance with aspects of the present disclosure. The operations of method 2200 may be implemented by a base station 105 or its components as described herein. For example, the operations of method 2200 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may receive, from a user equipment (UE), a first reference signal that is transmitted using a first set of reference signal resources, the first set of reference signal resources associated with a first set of reference signal ports having a first precoding configuration applied to a set of antenna ports. The operations of 2205 may be performed according to the methods described herein. In certain examples, aspects of the operations of 2205 may be performed by a reference signal manager as described with reference to FIGS. 12 through 15.

At 2210 the base station 105 may select at least one reference signal port from the first set of reference signal ports (e.g., a first subset) associated with the first set of reference signal resources to be used by the UE for a first uplink transmission. For example, the at least one reference signal port may be selected by selecting a first subset of the first set of reference signal resources. The operations of 2210 may be performed according to the methods described herein. In certain examples, aspects of the operations of 2210 may be performed by a resource selection component as described with reference to FIGS. 12 through 15.

At 2215 the base station 105 may determine a timing for transmitting an uplink grant to the UE that indicates the selected at least one reference signal port (e.g., the first subset) associated with the first set of reference signal resources for the first uplink transmission, the timing based at least in part on a timing threshold. The operations of 2215 may be performed according to the methods described herein. In certain examples, aspects of the operations of 2215 may be performed by a timing component as described with reference to FIGS. 12 through 15.

At 2220 the base station 105 may transmit the uplink grant to the UE according to the determined timing. The operations of 2220 may be performed according to the methods described herein. In certain examples, aspects of the operations of 2220 may be performed by a resource allocation manager as described with reference to FIGS. 12 through 15.

At 2225 the base station 105 may transmit, to the UE, an indication of the timing threshold. The operations of 2225 may be performed according to the methods described herein. In certain examples, aspects of the operations of 2225 may be performed by a timing component as described with reference to FIGS. 12 through 15. As discussed herein, in some cases the timing threshold may be preconfigured (e.g., in a specification), and may be known by the base station and the UE. In other cases, a set of candidate timing thresholds may be configured via higher layer signaling (e.g., via RRC signaling or in a medium access control (MAC) control element, prior to the initiation of any SRS transmissions), and DCI may indicate a specific value in the set (and may be provided together with the uplink grant). In other cases, the timing threshold may be dynamically indicated along with the SRI.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting a first reference signal using a first set of reference signal resources, the first set of reference signal resources associated with a first set of reference signal ports having a first precoding configuration applied to a set of antenna ports;
receiving an uplink grant and a sounding reference signal (SRS) resource indicator (SRI) that indicates at least one reference signal port from the first set of reference signal ports is to be used for an uplink transmission,
wherein a second reference signal is to be transmitted after receiving the uplink grant and before the uplink transmission, the second reference signal associated with a second set of reference signal resources; and
dropping transmission of the second reference signal based at least in part on the receiving the uplink grant.

2. The method of claim 1, further comprising:
modifying a third reference signal using the first precoding configuration associated with the first set of reference signal resources.

3. The method of claim 1, further comprising:
identifying a timing threshold associated with the uplink transmission;
determining that a time difference between an end of a transmission period of a third reference signal and a start of a transmission period of the uplink transmission exceeds the timing threshold; and
transmitting the third reference signal using a second precoding configuration different from the first precoding configuration.

4. The method of claim 1, further comprising:
identifying a timing threshold associated with the uplink transmission;
determining that a time difference between an end of a transmission period of a third reference signal and a start of a transmission period of the uplink transmission is less than or equal to the timing threshold; and
transmitting the third reference signal using the first precoding configuration associated with the first set of reference signal resources.

5. The method of claim 1, further comprising:
identifying a timing threshold associated with the uplink transmission; and
determining that a time difference between an end of a transmission period of the second reference signal and a start of a transmission period of the uplink transmission is less than or equal to the timing threshold.

6. The method of claim 1, further comprising:
receiving, from a base station, an indication of a timing threshold,
wherein the dropping the transmission of the second reference signal is based at least in part on the timing threshold.

7. The method of claim 6, wherein a set of candidate timing thresholds is indicated via higher layer signaling, the timing threshold being selected from the set of candidate timing thresholds and being transmitted in control information included with the uplink grant, the higher layer signaling comprising at least one of radio resource control (RRC) signaling or a medium access control (MAC) control element (CE).

8. The method of claim 6, wherein the timing threshold is based at least in part on a processing time for a user equipment (UE) to prepare the uplink transmission.

9. A method for wireless communication, comprising:
receiving, from a user equipment (UE), a first reference signal that is transmitted using a first set of reference signal resources, the first set of reference signal resources being associated with a first set of reference signal ports having a first precoding configuration applied to a set of antenna ports of the UE;
selecting at least one reference signal port from the first set of reference signal ports to be used by the UE for a first uplink transmission;
transmitting an uplink grant and a sounding reference signal (SRS) resource indicator (SRI) to the UE that indicates the at least one reference signal port for the first uplink transmission,
wherein a second reference signal is to be transmitted by the UE before the first uplink transmission, the second reference signal to be transmitted using a second set of reference signal resources associated with a second set of reference signal ports having a second precoding configuration applied to the set of antenna ports; and
refraining from monitoring for a reference signal from the UE until receiving the first uplink transmission, the refraining being based at least in part on at least one of a determination that a transmission of the second reference signal will be dropped or the transmitting the uplink grant.

10. The method of claim 9, further comprising:
determining that the first precoding configuration associated with the first set of reference signal resources corresponding to the at least one reference signal port will be used for a third reference signal; and
applying one or more parameters for receiving the third reference signal based at least in part on the determining.

11. The method of claim 9, further comprising:
identifying a timing threshold associated with the first uplink transmission;

determining that a time difference between an end of a transmission period of a third reference signal and a start of a transmission period of the first uplink transmission exceeds the timing threshold; and receiving the third reference signal in accordance with the second precoding configuration based at least in part on the determining.

12. The method of claim 9, further comprising:

identifying a timing threshold associated with the first uplink transmission;

determining that a time difference between an end of a transmission period of a third reference signal and a start of a transmission period of the first uplink transmission is less than or equal to the timing threshold; and receiving the third reference signal in accordance with the first precoding configuration based at least in part on the determining.

13. The method of claim 9, further comprising:

identifying a timing threshold associated with the first uplink transmission; and determining that a time difference between an end of a transmission period of the second reference signal and a start of a transmission period of the first uplink transmission is less than or equal to the timing threshold.

14. The method of claim 9, further comprising:

transmitting, to the UE, an indication of a timing threshold.

15. A method for wireless communication, comprising:

transmitting a first reference signal using a first set of reference signal resources, the first set of reference signal resources being associated with a first set of reference signal ports having a first precoding configuration applied to a set of antenna ports;

receiving an uplink grant that indicates at least one reference signal port from the first set of reference signal ports is to be used for an uplink transmission; and receiving an indication of a time difference threshold associated with a timing of receiving the uplink grant, wherein whether a subset of reference signal resources to be used for a first uplink transmission is to be selected from the first set of reference signal resources is based at least in part on the received indication of the time difference threshold.

16. The method of claim 15, further comprising:

transmitting, after transmitting the first reference signal and before a start of the uplink grant, a second reference signal using a second set of reference signal resources, the second set of reference signal resources being associated with a second set of reference signal ports having a second precoding configuration applied to the set of antenna ports; and determining, based at least in part on the time difference threshold associated with the timing of receiving the uplink grant, that the subset of reference signal resources to be used for the first uplink transmission is selected from the first set of reference signal resources rather than the second set of reference signal resources.

17. The method of claim 15, further comprising:

identifying that a second reference signal is a most recent reference signal prior to a start of a reception of the uplink grant by at least the time difference threshold; and determining, based at least in part on the time difference threshold associated with the timing of receiving the uplink grant, that the subset of reference signal resources to be used for the first uplink transmission is selected from a second set of reference signal resources.

18. The method of claim 15, wherein a set of candidate time difference thresholds is received via higher layer signaling and the time difference threshold is selected from the set of candidate time difference thresholds and is received in control information included with the uplink grant, the higher layer signaling comprising at least one of radio resource control (RRC) signaling or a medium access control (MAC) control element (CE).

19. The method of claim 15, wherein the time difference threshold is provided in timing information associated with a sounding reference signal (SRS) resource indicator (SRI) in the uplink grant.

20. The method of claim 15, wherein the time difference threshold is based at least in part on a processing time for a user equipment (UE) to prepare the uplink transmission.

21. A method for wireless communication, comprising:

receiving, from a user equipment (UE), a first reference signal that is transmitted using a first set of reference signal resources, the first set of reference signal resources being associated with a first set of reference signal ports having a first precoding configuration applied to a set of antenna ports of the UE;

selecting at least one reference signal port from the first set of reference signal ports to be used by the UE for a first uplink transmission;

transmitting an indication of a time difference threshold associated with a timing of an uplink grant, wherein a timing for transmitting the uplink grant to the UE that indicates the at least one reference signal port for the first uplink transmission is based at least in part on the time difference threshold; and transmitting the uplink grant to the UE according to the timing for transmitting the uplink grant to the UE.

22. The method of claim 21, wherein the timing for transmitting the uplink grant is less than a time duration of the time difference threshold.

23. The method of claim 21, further comprising:

receiving from the UE, a second reference signal that is transmitted using a second set of reference signal resources, the second reference signal being transmitted later than an end of a reception of the first reference signal, wherein the timing for transmitting the uplink grant is no later than the time difference threshold plus a time duration between receiving the first reference signal and the reception of the second reference signal from the UE.

24. The method of claim 21, wherein the indication of the time difference threshold is transmitted in higher layer signaling prior to the first reference signal, and wherein a set of candidate timing thresholds is indicated via higher layer signaling, the time difference threshold is selected from the set of candidate timing thresholds and is transmitted in control information included with the uplink grant.

25. The method of claim 24, wherein the higher layer signaling comprises at least one of radio resource control (RRC) signaling or a medium access control (MAC) control element (CE).

26. The method of claim 21, wherein the time difference threshold is a timing information associated with a sounding reference signal (SRS) resource indicator (SRI).

* * * * *